US012712380B2

(12) United States Patent
Colby, Jr. et al.

(10) Patent No.: US 12,712,380 B2
(45) **Date of Patent: *Aug. 18, 2026**

(54) METHOD TO DETECT BACK-FEED AND MIS-WIRING EVENTS BY A UPS SYSTEM

(71) Applicant: SCHNEIDER ELECTRIC IT CORPORATION, Foxboro, MA (US)

(72) Inventors: Kenneth A. Colby, Jr., Hollis, NH (US); Wei-Hsiang Lin, New Taipei City (CN); Venkatraman Chennakesavan, Groton, MA (US); Eyob Demissie, Westford, MA (US); Luka Petrovic, North Billerica, MA (US); Himamshu V Prasad, Tewksbury, MA (US); Yu Zhang, Shanghai (CN)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,402

(22) Filed: Dec. 13, 2023

(65) Prior Publication Data

US 2024/0113552 A1 Apr. 4, 2024

Related U.S. Application Data

(63) Continuation of application No. 17/655,474, filed on Mar. 18, 2022, now Pat. No. 11,909,258.

(Continued)

(51) Int. Cl.
*H02J 9/00* (2006.01)
*H01H 47/00* (2006.01)

(Continued)

(52) U.S. Cl.
CPC .......... *H02J 9/062* (2013.01); *H01H 47/002* (2013.01); *H02M 5/42* (2013.01)

(58) Field of Classification Search
CPC .................................. H02J 9/06; H02M 5/42
See application file for complete search history.

(56) References Cited

U.S. PATENT DOCUMENTS 10,218,217 B2 * 2/2019 Stoevring .............. H02J 9/062
2003/0090156 A1 5/2003 Haneda et al.

(Continued)

OTHER PUBLICATIONS

Extended European Search Report from corresponding European Application No. 22163347.2 dated Aug. 16, 2022.

*Primary Examiner* — Ryan Johnson
*Assistant Examiner* — Esayas G Yeshaw
(74) *Attorney, Agent, or Firm* — Kinney & Lange, P.A.

(57) ABSTRACT

Power supplies and methods of use thereof are provided, where a power supply includes an input configured to receive input AC power an output configured to provide output AC power to a load, at least one power converter coupled to the input and configured to convert the input AC power into the output AC power, a controller coupled the at least one power converter. The controller is configured to adjust at least one parameter of the output AC power provided by the at least one power converter, detect, in response to adjusting the at least one parameter of the output AC power, at least one of an adjusted input AC power or an adjusted output AC power, and determine that a fault has occurred based on the at least one of the adjusted input AC power or the adjusted output AC power.

20 Claims, 15 Drawing Sheets

Related U.S. Application Data

(60) Provisional application No. 63/164,190, filed on Mar. 22, 2021.

(51) Int. Cl.
*H02J 9/06* (2006.01)
*H02M 5/42* (2006.01)

(56) References Cited

U.S. PATENT DOCUMENTS

| | | | | |
|---|---|---|---|---|
| 2006/0126241 | A1 | 6/2006 | Unger et al. | |
| 2009/0021079 | A1 | 1/2009 | Johnson, Jr. et al. | |
| 2011/0031911 | A1* | 2/2011 | Marcinkiewicz ... | H02M 1/4225 318/400.3 |
| 2012/0299381 | A1* | 11/2012 | Larson ...................... | H02J 9/06 307/64 |
| 2012/0306274 | A1* | 12/2012 | Shetler, Jr. .............. | H02J 9/062 307/64 |
| 2014/0183958 | A1 | 7/2014 | Yeh et al. | |
| 2017/0179847 | A1* | 6/2017 | Porter ..................... | H02M 7/44 |
| 2019/0081505 | A1 | 3/2019 | Akita et al. | |
| 2021/0098985 | A1* | 4/2021 | Kim ......................... | H02H 7/26 |
| 2021/0135487 | A1 | 5/2021 | Sok et al. | |
| 2021/0213843 | A1* | 7/2021 | Nishio .................... | B60L 53/60 |
| 2021/0288492 | A1 | 9/2021 | Rixhon et al. | |
| 2023/0126969 | A1* | 4/2023 | Yang ...................... | H02H 3/087 361/88 |

* cited by examiner

METHOD TO DETECT BACK-FEED AND MIS-WIRING EVENTS BY A UPS SYSTEM

CROSS-REFERENCE TO RELATED APPLICATION

This application is a continuation of U.S. application Ser. No. 17/655,474, titled A METHOD TO DETECT BACK-FEED AND MIS-WIRING EVENTS BY A UPS SYSTEM, filed on Mar. 18, 2022, which claims the benefit under 35 U.S.C. § 119(e) of U.S. provisional patent application No. 63/164,190, filed Mar. 22, 2021, titled A METHOD TO DETECT BACK-FEED AND MIS-WIRING EVENTS BY A UPS SYSTEM. Each application referenced above is hereby incorporated by reference in its entirety for all purposes.

BACKGROUND OF INVENTION

1. Field of Invention

Embodiments of the present disclosure relate generally to power supply systems and methods for controlling power supply systems.

2. Discussion of Related Art

The use of power supply systems, such as uninterruptible power supplies (UPS), to provide regulated, uninterrupted power for sensitive and/or critical loads, such as computer systems and other data processing systems, is known. Known uninterruptible power supplies include on-line UPS's, off-line UPS's, line interactive UPS's as well as others. On-line UPS's provide conditioned AC power as well as back-up AC power upon interruption of a primary source of AC power. Off-line UPS's typically do not provide conditioning of input AC power but do provide back-up AC power upon interruption of the primary AC power source. Line interactive UPS's are similar to off-line UPS's in that they switch to battery power when a blackout occurs but also typically include a multi-tap transformer for regulating the output voltage provided by the UPS.

SUMMARY

At least one aspect of the present disclosure is directed to a power supply including an input, an output, and a processor coupled to a memory element and configured to operate the power supply to: adjust a first electrical parameter of an output signal at the output by a first amount, detect a change of a second electrical parameter of the output signal by a second amount, compare the first amount to the second amount, and output a signal indicating a back-feed detection.

Another aspect of the present disclosure is directed to power supply including an input, an output, and a processor coupled to a memory element and configured to operate the power supply to detect a change of an electrical parameter of an input signal by a first amount, detect a change of an electrical parameter of an output signal by a second amount, compare the first amount to the second amount, and output a signal indicating a back-feed detection.

Another aspect of the present disclosure is directed to an Uninterruptible Power Supply (UPS). The UPS includes an input configured to receive input AC power, an output configured to provide output AC power to a load, at least one power converter coupled to the input and configured to convert the input AC power into the output AC power, and a controller coupled the at least one power converter, the controller being configured to: adjust at least one parameter of the output AC power provided by the at least one power converter, monitor, in response to adjusting the at least one parameter of the output AC power, at least one of the input AC power or the output AC power, and determine whether a fault has occurred based on the monitoring of the at least one of the input AC power or the output AC power.

In one embodiment, wherein in adjusting the at least one parameter of the output AC power, the controller is further configured to add a high frequency component to the output AC power. In some embodiments, monitoring the at least one of the input AC power or the output AC power comprises monitoring the input AC power at the input. In various embodiments, wherein in determining whether a fault has occurred based on the monitoring of the at least one of the input AC power or the output AC power, the controller is further configured to determine that a fault has occurred in response to a detection of the high frequency component in the input AC power. In certain embodiments, wherein in adjusting the at least one parameter of the output AC power, the controller is further configured to adjust a frequency of the output AC power.

In some embodiments, wherein in adjusting the frequency of the output AC power, the controller is further configured to adjust the frequency of the output AC power such that the frequency of the output AC power is different than a frequency of the input AC power. In one embodiment, wherein in monitoring the at least one of the input AC power or the output AC power, the controller is further configured to monitor a current of the output AC power at the output relative to a nominal current threshold. In certain embodiments, wherein in determining whether a fault has occurred based on the monitoring of the at least one of the input AC power or the output AC power, the controller is further configured to determine that a fault has occurred in response to the current of the output AC power rising above the nominal current threshold. In various embodiments, wherein in monitoring the at least one of the input AC power or the output AC power, the controller is further configured to monitor the input AC power at the input and the output AC power at the output.

In one embodiment, wherein in determining whether a fault has occurred based on the monitoring of the at least one of the input AC power or the output AC power, the controller is further configured to determine that a fault has occurred in response to a frequency of the input AC power and the frequency of the output AC power being substantially the same. In some embodiments, wherein in adjusting the at least one parameter of the output AC power, the controller is further configured to adjust a voltage of the output AC power. In various embodiments, wherein in determining whether a fault has occurred based on the monitoring of the at least one of the input AC power or the output AC power, the controller is further configured to determine that a fault has occurred in response to a frequency of the input AC power and the frequency of the output AC power being substantially the same and a voltage of the input AC power and the voltage of the output AC power being substantially the same. In certain embodiments, the fault provides an indication that contacts of at least one relay included in the UPS are welding or shorted together.

In some embodiments, wherein in monitoring at least one of the input AC power or the output AC power, the controller is further configured to monitor a current of the output AC power at the output relative to a nominal current threshold. In one embodiment, wherein in adjusting the at least one parameter of the output AC power, the controller is further configured to adjust a voltage of the output AC power. In various embodiments, wherein in adjusting the voltage of the output AC power, the controller is further configured to increase the voltage of the output AC power. In certain embodiments, wherein in determining whether a fault has occurred based on the monitoring of the at least one of the input AC power or the output AC power, the controller is further configured to determine that a fault has occurred in response to the current of the output AC power rising above the nominal current threshold.

In some embodiments, wherein in adjusting the voltage of the output AC power, the controller is further configured to decrease the voltage of the output AC power. In one embodiment, wherein in determining whether a fault has occurred based on the monitoring of the at least one of the input AC power or the output AC power, the controller is further configured to determine that a fault has occurred in response to the current of the output AC power falling below the nominal current threshold. In various embodiments, wherein in adjusting the voltage of the output AC power, the controller is further configured to chop a portion of the voltage of the output AC power. In certain embodiments, wherein in determining whether a fault has occurred based on the monitoring of the at least one of the input AC power or the output AC power, the controller is further configured to determine that a fault has occurred in response to the current of the output AC power rising above the nominal current threshold.

In one embodiment, wherein in adjusting the at least one parameter of the output AC power, the controller is further configured to adjust a phase of the output AC power. In some embodiments, wherein in determining whether a fault has occurred based on the monitoring of the at least one of the input AC power or the output AC power, the controller is further configured to determine that a fault has occurred in response to the current of the output AC power rising above the nominal current threshold. Another aspect of the present disclosure is directed to a non-transitory computer-readable medium storing thereon sequences of computer-executable instructions for operating an Uninterruptible Power Supply (UPS). The sequences of computer-executable instructions including instructions that instruct at least one processor to control the UPS to: receive input AC power at an input, provide output AC power to an output, operate at least one power converter to convert the input AC power into the output AC power, adjust at least one parameter of the output AC power provided by the at least one power converter, monitor, in response to adjusting the at least one parameter of the output AC power, at least one of the input AC power or the output AC power, and determine whether a fault has occurred based on the monitoring of the at least one of the input AC power or the output AC power.

In one embodiment, wherein in adjusting the at least one parameter of the output AC power, the at least one processor is further configured to control the UPS to add a high frequency component to the output AC power. In some embodiments, wherein in monitoring the at least one of the input AC power or the output AC power, the at least one processor is further configured to control the UPS to monitor the input AC power at the input. In certain embodiments, wherein in determining whether a fault has occurred based on the monitoring of the at least one of the input AC power or the output AC power, the at least one processor is further configured to control the UPS to determine that a fault has occurred in response to a detection of the high frequency component in the input AC power. In various embodiments, wherein in adjusting the at least one parameter of the output AC power, the at least one processor is further configured to control the UPS to adjust a frequency of the output AC power.

In some embodiments, wherein in adjusting the frequency of the output AC power, the at least one processor is further configured to control the UPS to adjust the frequency of the output AC power such that the frequency of the output AC power is different than a frequency of the input AC power. In one embodiment, wherein in monitoring the at least one of the input AC power or the output AC power, the at least one processor is further configured to control the UPS to monitor a current of the output AC power at the output relative to a nominal current threshold. In certain embodiments, wherein in determining whether a fault has occurred based on the monitoring of the at least one of the input AC power or the output AC power, the at least one processor is further configured to control the UPS to determine that a fault has occurred in response to the current of the output AC power rising above the nominal current threshold. In various embodiments, wherein in monitoring the at least one of the input AC power or the output AC power, the at least one processor is further configured to control the UPS to monitor the input AC power at the input and the output AC power at the output.

In one embodiment, wherein in determining whether a fault has occurred based on the monitoring of the at least one of the input AC power or the output AC power, the at least one processor is further configured to control the UPS to determine that a fault has occurred in response to a frequency of the input AC power and the frequency of the output AC power being substantially the same. In some embodiments, wherein in adjusting the at least one parameter of the output AC power, the at least one processor is further configured to control the UPS to adjust a voltage of the output AC power. In various embodiments, wherein in determining whether a fault has occurred based on the monitoring of the at least one of the input AC power or the output AC power, the at least one processor is further configured to control the UPS to determine that a fault has occurred in response to a frequency of the input AC power and the frequency of the output AC power being substantially the same and a voltage of the input AC power and the voltage of the output AC power being substantially the same. In certain embodiments, the fault provides an indication that two or more contacts of at least one relay included in the UPS are welding or shorted together.

In some embodiments, wherein in monitoring the at least one of the input AC power or the output AC power, the at least one processor is further configured to control the UPS to monitor a current of the output AC power at the output relative to a nominal current threshold. In one embodiment, wherein in adjusting the at least one parameter of the output AC power, the at least one processor is further configured to control the UPS to adjust a voltage of the output AC power. In certain embodiments, wherein in adjusting the voltage of the output AC power, the at least one processor is further configured to control the UPS to increase the voltage of the output AC power. In various embodiments, wherein in determining whether a fault has occurred based on the monitoring of the at least one of the input AC power or the output AC power, the at least one processor is further configured to control the UPS to determine that a fault has occurred in response to the current of the output AC power rising above the nominal current threshold.

In one embodiment, wherein in adjusting the voltage of the output AC power, the at least one processor is further configured to control the UPS to decrease the voltage of the output AC power. In some embodiments, wherein in determining whether a fault has occurred based on the monitoring of the at least one of the input AC power or the output AC power, the at least one processor is further configured to control the UPS to determine that a fault has occurred in response to the current of the output AC power falling below the nominal current threshold. In various embodiments, wherein in adjusting the voltage of the output AC power, the at least one processor is further configured to control the UPS to chop the voltage of the output AC power. In certain embodiments, wherein in determining whether a fault has occurred based on the monitoring of the at least one of the input AC power or the output AC power, the at least one processor is further configured to control the UPS to determine that a fault has occurred in response to the current of the output AC power rising above the nominal current threshold.

In some embodiments, wherein in adjusting the at least one parameter of the output AC power, the at least one processor is further configured to control the UPS to adjust a phase of the output AC power. In one embodiment, wherein in determining whether a fault has occurred based on the monitoring of the at least one of the input AC power or the output AC power, the at least one processor is further configured to control the UPS to determine that a fault has occurred in response to the current of the output AC power rising above the nominal current threshold.

At least one aspect of the present disclosure is directed to a power supply comprising an input configured to receive input AC power, an output configured to provide output AC power to a load, at least one power converter coupled to the input and configured to convert the input AC power into the output AC power, and a controller coupled the at least one power converter, the controller being configured to adjust at least one parameter of the output AC power provided by the at least one power converter, detect, in response to adjusting the at least one parameter of the output AC power, at least one of an adjusted input AC power or an adjusted output AC power, and determine that a fault has occurred based on the at least one of the adjusted input AC power or the adjusted output AC power.

In one example, adjusting the at least one parameter of the output AC power comprises adding a high frequency component to the output AC power. Determining that the fault has occurred based on the adjusted output AC power comprises in at least one example, determining that the fault has occurred in response to a detection of the high frequency component in the adjusted input AC power.

In another example, detecting the adjusted input AC power comprises monitoring the input AC power at the input.

In one example, determining that the fault has occurred includes determining that the fault has occurred based on the adjusted input AC power.

In another example, detecting the adjusted output AC power comprises monitoring the output AC power at the output.

In one example, determining that the fault has occurred includes determining that the fault has occurred based on the adjusted output AC power.

In another example, the at least one parameter of the output AC power comprises adjusting a frequency of the output AC power. Adjusting the frequency of the output AC power comprises, in at least one example, adjusting the frequency of the output AC power such that the frequency of the adjusted output AC power is different than a frequency of the input AC power. Determining that the fault has occurred based on the at least one of the adjusted input AC power or the adjusted output AC power comprises, in at least one example, determining that the fault has occurred in response to a difference between a frequency of the adjusted input AC power and the frequency of the adjusted output AC power being less than a threshold difference. Determining that the fault has occurred based on the at least one of the adjusted input AC power or the adjusted output AC power comprises, in at least one example, determining that the fault has occurred in response to the difference between the frequency of the adjusted input AC power and the frequency of the adjusted output AC power being less than the threshold difference and a difference between a voltage of the adjusted input AC power and a voltage of the adjusted output AC power being less than a voltage difference threshold.

In one example, detecting the at least one of the adjusted input AC power or the adjusted output AC power comprises monitoring a current of the output AC power at the output relative to a nominal current threshold. Determining that the fault has occurred based on the at least one of the adjusted input AC power or the adjusted output AC power comprises, in at least one example, determining that the fault has occurred in response to the current of the adjusted output AC power rising above the nominal current threshold. Determining that the fault has occurred based on the at least one of the adjusted input AC power or the adjusted output AC power comprises, in at least one example, determining that the fault has occurred in response to the current of the adjusted output AC power falling below the nominal current threshold.

In another example, detecting the at least one of the adjusted input AC power or the adjusted output AC power comprises monitoring the input AC power at the input and the output AC power at the output.

In one example, the fault provides an indication that contacts of at least one relay included in the power supply are welded or shorted together.

In another example, adjusting the at least one parameter of the output AC power comprises adjusting a voltage of the output AC power. Adjusting the voltage of the output AC power comprises, in at least one example, increasing the voltage of the output AC power. Adjusting the voltage of the output AC power comprises, in at least one example, decreasing the voltage of the output AC power. Adjusting the voltage of the output AC power comprises, in at least one example, chopping a portion of the voltage of the output AC power.

In one example, adjusting the at least one parameter of the output AC power comprises adjusting a phase of the output AC power.

In another example, the power supply is an Uninterruptible Power Supply (UPS).

In one example, detecting the at least one of the adjusted input AC power or the adjusted output AC power comprises monitoring the input AC power at the input.

In another example, detecting the at least one of the adjusted input AC power or the adjusted output AC power comprises monitoring the output AC power at the output.

Another aspect of the present disclosure is directed to a non-transitory computer-readable medium storing thereon sequences of computer-executable instructions for operating a power supply, the sequences of computer-executable instructions including instructions that instruct at least one processor to control the power supply to receive input AC power at an input, provide output AC power to an output, operate at least one power converter to convert the input AC power into the output AC power, adjust at least one parameter of the output AC power provided by the at least one power converter, detect, in response to adjusting the at least one parameter of the output AC power, at least one of an adjusted input AC power or an adjusted output AC power, and determine that a fault has occurred based on at least one of the adjusted input AC power or the adjusted output AC power.

In one example, the instructions that instruct the at least one processor to control the power supply to adjust the at least one parameter of the output AC power include instructions to add a high frequency component to the output AC power. The instructions that instruct the at least one processor to determine whether a fault has occurred based on the detection of the adjusted output AC power include instructions, in at least one example, to determine that the fault has occurred in response to a detection of the high frequency component in the adjusted input AC power.

In another example, the instructions that instruct the at least one processor to detect the adjusted input AC power include instructions to monitor the input AC power at the input.

In one example, the instructions that instruct the at least one processor to determine that the fault has occurred include instructions to determine that the fault has occurred based on the adjusted input AC power.

In another example, the instructions that instruct the at least one processor to detect the adjusted output AC power include instructions to monitor the output AC power at the output.

In one example, the instructions that instruct the at least one processor to determine that the fault has occurred include instructions to determine that the fault has occurred based on the adjusted output AC power.

In another example, the instructions that instruct the at least one processor to adjust the at least one parameter of the output AC power provided by the at least one power converter include instructions to adjust a frequency of the output AC power. The instructions that instruct the at least one processor to adjust the at least one parameter of the output AC power provided by the at least one power converter include, in at least one example, instructions to adjust the frequency of the output AC power such that the frequency of the adjusted output AC power is different than a frequency of the input AC power. The instructions that instruct the at least one processor to determine that the fault has occurred based on the detection of the at least one of the adjusted input AC power or the adjusted output AC power include, in at least one example, instructions to determine that the fault has occurred in response to a difference between a frequency of the adjusted input AC power and the frequency of the adjusted output AC power being less than a threshold difference. The instructions that instruct the at least one processor to determine that the fault has occurred based on the detection of the at least one of the adjusted input AC power or the adjusted output AC power include, in at least one example, instructions to determine that the fault has occurred in response to the difference between the frequency of the adjusted input AC power and the frequency of the adjusted output AC power being less than the difference threshold and a difference between a voltage of the input AC power and a voltage of the output AC power being less than a voltage difference threshold.

In one example, the instructions that instruct the at least one processor to detect the at least one of the adjusted input AC power or the adjusted output AC power include instructions to monitor a current of the output AC power at the output relative to a nominal current threshold. The instructions that instruct the at least one processor to determine that the fault has occurred based on the detection of the at least one of the adjusted input AC power or the adjusted output AC power include, in at least one example, instructions to determine that the fault has occurred in response to the current of the adjusted output AC power rising above the nominal current threshold. The instructions that instruct the at least one processor to determine that the fault has occurred based on the detection of the at least one of the adjusted input AC power or the adjusted output AC power include, in at least one example, instructions to determine that the fault has occurred in response to the current of the adjusted output AC power falling below the nominal current threshold.

In another example, the instructions that instruct the at least one processor to detect the at least one of the adjusted input AC power or the adjusted output AC power include instructions to monitor the input AC power at the input and the output AC power at the output.

In one example, the fault provides an indication that contacts of at least one relay included in the power supply are welded or shorted together.

In another example, the instructions that instruct the at least one processor to adjust the at least one parameter of the output AC power provided by the at least one power converter include instructions to adjust a voltage of the output AC power. The instructions that instruct the at least one processor to adjust the at least one parameter of the output AC power provided by the at least one power converter include, in at least one example, instructions to increase the voltage of the output AC power. The instructions that instruct the at least one processor to adjust the at least one parameter of the output AC power provided by the at least one power converter include, in at least one example, instructions to decrease the voltage of the output AC power. The instructions that instruct the at least one processor to adjust the at least one parameter of the output AC power provided by the at least one power converter include, in at least one example, instructions to chop a portion of the voltage of the output AC power.

In one example, the instructions that instruct the at least one processor to adjust the at least one parameter of the output AC power provided by the at least one power converter include instructions to adjust a phase of the output AC power.

In another example, the power supply is an Uninterruptible Power Supply (UPS).

Another aspect of the present disclosure is directed to a method of operating a power supply including an input configured to receive input AC power, an output configured to provide output AC power to a load, at least one power converter coupled to the input and configured to convert the input AC power into the output AC power, and a controller coupled to the at least one power converter, the method comprising receiving input AC power at the input, providing, at the output, output AC power to the load, converting, by the at least one power converter, the input AC power into the output AC power coupled to the input, adjusting at least one parameter of the output AC power provided by the at least one power converter, detecting, in response to adjusting the at least one parameter of the output AC power, at least one of an adjusted input AC power or an adjusted output AC power, and determining that a fault has occurred based on the at least one of the adjusted input AC power or the adjusted output AC power.

In one example, adjusting the at least one parameter of the output AC power comprises adding a high frequency component to the output AC power. Determining that the fault has occurred based on the adjusted output AC power comprises, in at least one example, determining that the fault has occurred in response to a detection of the high frequency component in the adjusted input AC power.

In another example, detecting the adjusted input AC power comprises monitoring the input AC power at the input.

In one example, determining that the fault has occurred includes determining that the fault has occurred based on the adjusted input AC power.

In another example, detecting the adjusted output AC power comprises monitoring the output AC power at the output.

In one example, determining that the fault has occurred includes determining that the fault has occurred based on the adjusted output AC power.

In another example, adjusting the at least one parameter of the output AC power comprises adjusting a frequency of the output AC power. Adjusting the frequency of the output AC power comprises, in at least one example, adjusting the frequency of the output AC power such that the frequency of the adjusted output AC power is different than a frequency of the input AC power. Determining that the fault has occurred based on the at least one of the adjusted input AC power or the adjusted output AC power comprises, in at least one example, determining that a fault has occurred in response to a difference between a frequency of the adjusted input AC power and a frequency of the adjusted output AC power being less than a threshold difference. Determining that the fault has occurred based on the at least one of the adjusted input AC power or the adjusted output AC power comprises, in at least one example, determining that the fault has occurred in response to the difference between the frequency of the adjusted input AC power and the frequency of the adjusted output AC power being less than the threshold difference and a difference between a voltage of the adjusted input AC power and a voltage of the adjusted output AC power being less than a voltage difference threshold.

In one example, detecting the at least one of the adjusted input AC power or the adjusted output AC power comprises monitoring a current of the output AC power at the output relative to a nominal current threshold. Determining that the fault has occurred based on the at least one of the adjusted input AC power or the adjusted output AC power comprises, in at least one example, determining that the fault has occurred in response to the current of the adjusted output AC power rising above the nominal current threshold. Determining whether a fault has occurred based on the at least one of the adjusted input AC power or the adjusted output AC power comprises, in at least one example, determining that the fault has occurred in response to the current of the adjusted output AC power falling below the nominal current threshold.

In another example, detecting the at least one of the adjusted input AC power or the adjusted output AC power comprises monitoring the input AC power at the input and the output AC power at the output.

In one example, the fault provides an indication that contacts of at least one relay included in the power supply are welded or shorted together.

In another example, adjusting the at least one parameter of the output AC power comprises adjusting a voltage of the output AC power. Adjusting the voltage of the output AC power comprises, in at least one example, increasing the voltage of the output AC power. Adjusting the voltage of the output AC power comprises, in at least one example, decreasing the voltage of the output AC power. Adjusting the voltage of the output AC power comprises, in at least one example, chopping a portion of the voltage of the output AC power.

In one example, adjusting the at least one parameter of the output AC power comprises adjusting a phase of the output AC power.

In another example, the power supply is an Uninterruptible Power Supply (UPS).

In one example, adjusting the at least one parameter of the output AC power comprises adding a high frequency component to the output AC power.

Another aspect of the present disclosure is directed to a power supply comprising an input configured to receive input AC power, an output configured to provide output AC power to a load, at least one power converter coupled to the input and configured to convert the input AC power into the output AC power, and a controller coupled the at least one power converter, the controller being configured to detect a change of at least one parameter of the input AC power, detect a change in the output AC power in response to detecting the change of the at least one parameter of the input AC power, and determine that a fault has occurred based on the detection of the change in the output AC power.

In one example, detecting the change in the output AC power comprises monitoring the output AC power at the output. Detecting the change in the output AC power comprises, in at least one example, monitoring a current of the output AC power at the output relative to a nominal current threshold. Determining that the fault has occurred based on the detection of the change in the output AC power comprises, in at least one example, determining that the fault has occurred in response to the current of the output AC power rising above the nominal current threshold. Determining that the fault has occurred based on the detection of the change in the output AC power comprises, in at least one example, determining that the fault has occurred in response to the current of the output AC power falling below the nominal current threshold.

In another example, detecting the change of the at least one parameter of the input AC power comprises monitoring the input AC power at the input.

In one example, the fault provides an indication that contacts of at least one relay included in the power supply are welded or shorted together.

In another example, detecting the change of the at least one parameter of the input AC power includes detecting a change in a voltage of the input AC power. Determining that the fault has occurred based on the detection of the change in the output AC power comprises, in at least one example, determining that the fault has occurred in response to an increase of the voltage of the input AC power and a corresponding decrease in a current of the output AC power. Determining that the fault has occurred based on the detection of the change in the output AC power comprises, in at least one example, determining that the fault has occurred in response to a decrease in the voltage of the input AC power and a corresponding increase in a current of the output AC power.

In one example, the power supply is an Uninterruptible Power Supply (UPS).

In one example, detecting the change in the output AC power comprises detecting a change in a frequency of the output AC power.

In another example, detecting the change of the at least one parameter of the input AC power comprises detecting a change in a frequency of the input AC power.

In one example, detecting the change in the output AC power comprises detecting a change in a voltage of the output AC power at the output.

In another example, detecting the change in the output AC power comprises detecting a change in a current of the output AC power at the output.

Another aspect of the present disclosure is directed to a non-transitory computer-readable medium storing thereon sequences of computer-executable instructions for operating a power supply, the sequences of computer-executable instructions including instructions that instruct at least one processor to control the power supply to receive input AC power at an input, provide output AC power to an output, operate at least one power converter to convert the input AC power into the output AC power, detect a change of at least one parameter of the input AC power, detect a change in the output AC power in response to detecting the change of the at least one parameter of the input AC power, and determine that a fault has occurred based on the detection of the change in the output AC power.

In one example, the instructions that instruct the at least one processor to detect the change in the output AC power include instructions to monitor the output AC power at the output. The instructions that instruct the at least one processor to detect the change in the output AC power include, in at least one example, instructions to monitor a current of the output AC power at the output relative to a nominal current threshold. The instructions that instruct the at least one processor to determine that the fault has occurred based on the detection of the change in the output AC power include, in at least one example, instructions to determine that the fault has occurred in response to the current of the output AC power rising above the nominal current threshold. The instructions that instruct the at least one processor to determine that the fault has occurred based on the detection of the change in the output AC power include, in at least one example, instructions to determine that the fault has occurred in response to the current of the output AC power falling below the nominal current threshold.

In another example, the instructions that instruct the at least one processor to detect the change of the at least one parameter of the input AC power include instructions to monitor the input AC power at the input.

In one example, the fault provides an indication that contacts of at least one relay included in the power supply are welded or shorted together.

In another example, the instructions that instruct the at least one processor to detect the change of the at least one parameter of the input AC power include instructions to detect a change in a voltage of the input AC power. The instructions that instruct the at least one processor to determine that the fault has occurred based on the detection of the change in the output AC power include, in at least one example, instructions to determine that the fault has occurred in response to an increase of the voltage of the input AC power and a corresponding decrease in a current of the output AC power. The instructions that instruct the at least one processor to determine that the fault has occurred based on the detection of the change in the output AC power include, in at least one example, instructions to determine that the fault has occurred in response to a decrease in the voltage of the input AC power and a corresponding increase in a current of the output AC power.

In one example, the power supply is an Uninterruptible Power Supply (UPS).

Another aspect of the present disclosure is directed to a method of operating a power supply including an input configured to receive input AC power, an output configured to provide output AC power to a load, at least one power converter coupled to the input and configured to convert the input AC power into the output AC power, and a controller coupled to the at least one power converter, the method comprising detecting a change of at least one parameter of the input AC power, detecting a change in the output AC power in response to detecting the change of the at least one parameter of the input AC power, and determining that a fault has occurred based on the detection of the change in the output AC power.

In one example, detecting the change in the output AC power comprises monitoring the output AC power at the output. Detecting the change in the output AC power comprises, in at least one example, monitoring a current of the output AC power at the output relative to a nominal current threshold. Determining that the fault has occurred based on the detection of the change in the output AC power comprises, in at least one example, determining that the fault has occurred in response to the current of the output AC power rising above the nominal current threshold. Determining that the fault has occurred based on the detection of the change in the output AC power comprises, in at least one example, determining that the fault has occurred in response to the current of the output AC power falling below the nominal current threshold.

In another example, wherein detecting the change of the at least one parameter of the input AC power comprises monitoring the input AC power at the input.

In one example, the fault provides an indication that contacts of at least one relay included in the power supply are welded or shorted together.

In another example, detecting the change of the at least one parameter of the input AC power includes detecting a change in a voltage of the input AC power. Determining that the fault has occurred based on the detection of the change in the output AC power comprises, in at least one example, determining that the fault has occurred in response to an increase of the voltage of the input AC power and a corresponding decrease in a current of the output AC power. Determining that the fault has occurred based on the detection of the change in the output AC power comprises, in at least one example, determining that the fault has occurred in response to a decrease in the voltage of the input AC power and a corresponding increase in a current of the output AC power.

In one example, the power supply is an Uninterruptible Power Supply (UPS).

BRIEF DESCRIPTION OF DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, power devices, such as uninterruptible power supplies (UPS), may be used to provide regulated, uninterrupted power to sensitive and/or critical loads. An online UPS rectifies input AC power provided by an electric utility using a Power Factor Correction converter circuit (PFC) to provide DC power to at least one DC bus. The rectified DC power on the DC bus(es) may be used to charge a battery while mains power is available. In the absence of mains power, the battery discharges and provides DC power to the DC bus(es). From the DC power on the DC bus(es), an inverter generates an AC output voltage that is provided to a load. Since power is provided to the DC bus(es) from either mains or the battery, the output power of the UPS is uninterrupted if the mains fails and the battery is sufficiently charged. Online UPS's may also operate in a bypass mode where unconditioned power with basic protection is provided directly from an AC power source to a load via a bypass line.

Figure 1A:
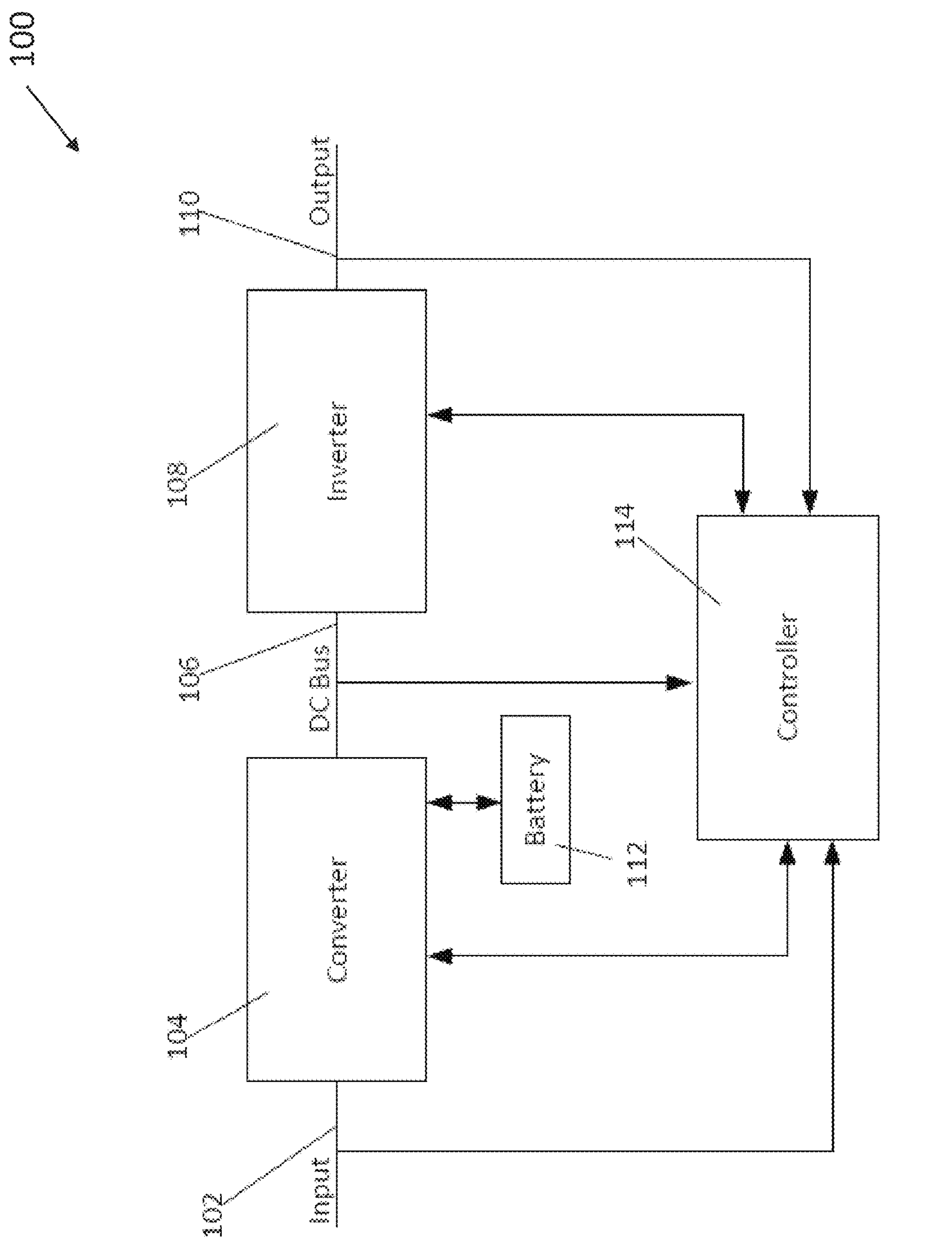
FIG. 1A is a functional block diagram of a UPS in accordance with aspects described herein.

FIG. 1A is a block diagram of one embodiment of an online UPS 100 that can provide regulated power, derived from input AC power received at an input 102 and/or back-up DC power from a battery 112, to an output 110. In some examples, the battery 112 may be included in the UPS 100; however, in other examples, the battery 112 may be external to the UPS 100. The UPS 100 includes a converter 104, a DC bus 106, an inverter 108, and a controller 114 for controlling the converter 104 and the inverter 108. The DC bus 106 is coupled between the converter 104 and the inverter 108.

The input 102 is configured to receive input AC power having an input voltage level from an AC power source. The controller 114 monitors the input AC power received by the input 102 and is configured to operate the UPS 100 in different modes of operation based on the status of the input AC power received by the input 102. When AC power provided to the input 102 is acceptable (i.e., above an input power quality threshold), the controller 114 operates the UPS 100 in an online mode of operation.

In the online mode of operation, AC power from the input 102 is provided to the converter 104. The controller 114 operates the converter 104 to convert the AC power into DC power and provide the DC power to the DC bus 106. DC power from the DC bus 106 is provided to the inverter 108. In addition, DC power from the DC bus 106 may be provided to the battery 112 for charging, either directly from the converter 104 or via a separate DC/DC converter (e.g., a charger). The controller 114 operates the inverter 108 to convert the DC power from the DC bus into regulated AC power and provide the regulated AC power to a load coupled to the output 110.

When AC power provided to the input 102 is not acceptable (i.e., below an input power quality threshold), the controller 114 operates the UPS 100 in a backup mode of operation. In the backup mode of operation, DC power from the battery 112 is provided to the DC bus 106. The inverter 108 receives the DC power from the DC bus 106, and the controller 114 operates the inverter 108 to convert the DC power from the DC bus 106 into regulated AC power and provide the regulated AC power to the output 110.

Figure 1B:
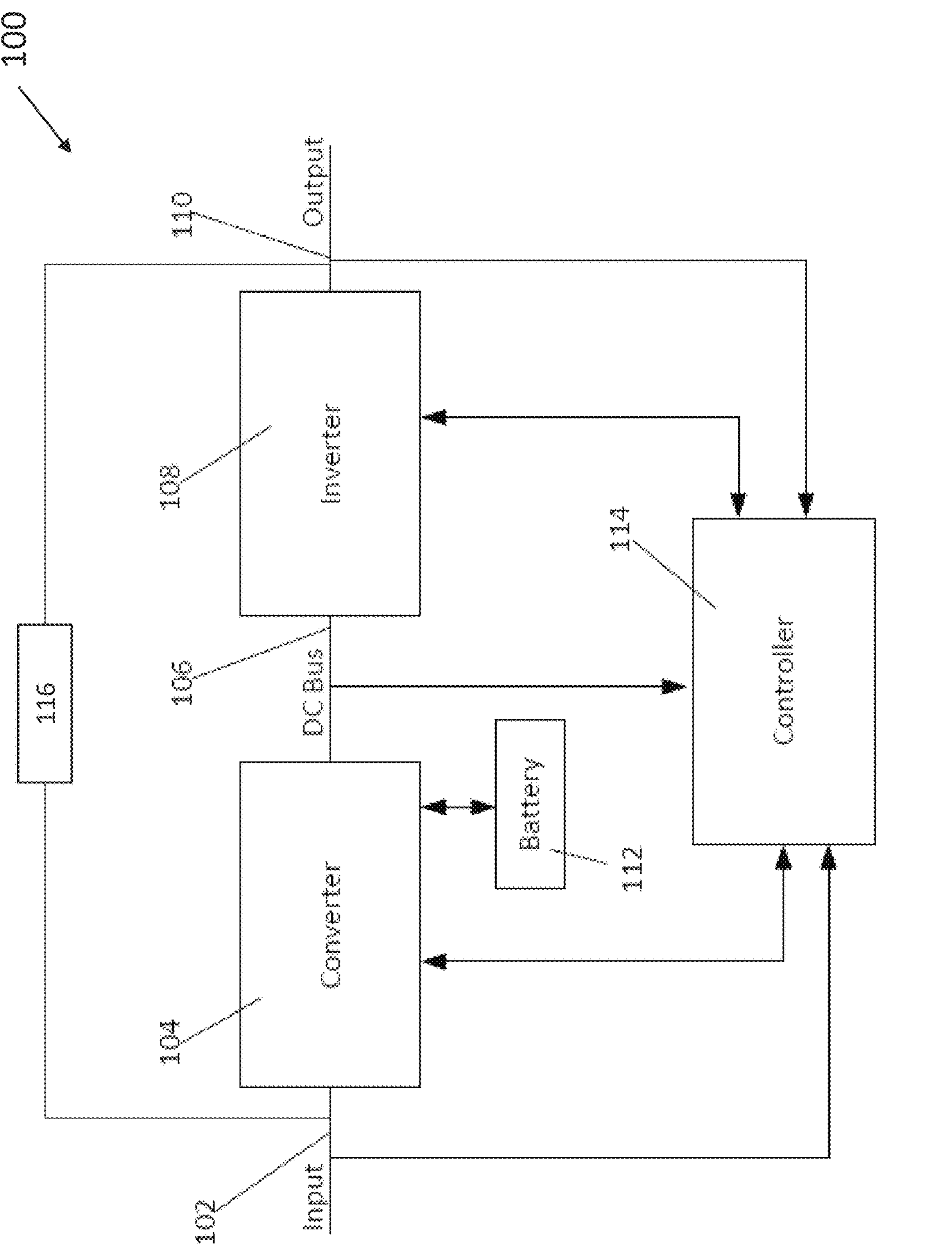
FIG. 1B is a functional block diagram of a UPS in accordance with aspects described herein.

As shown in FIG. 1B, in some examples, the UPS 100 can include a bypass relay 116 and be configured to operate in a bypass mode. In the bypass mode, the bypass relay 116 is turned on (i.e., closed) to connect the input 102 to the output 114. The input 102 receives AC power and provides the received power to the output 110. The output 110 receives the power from the input 102 and provides the power to the load (not shown).

In some examples, a different UPS configuration may be used depending on the application of use. For example, an offline UPS connects a load directly to utility power when mains power is available and sufficient to power a load. When utility power is unavailable or insufficient to power the load, the offline UPS operates a DC/AC inverter to convert DC power from a backup power source into desired AC power, which is provided to the load.

Figure 2:
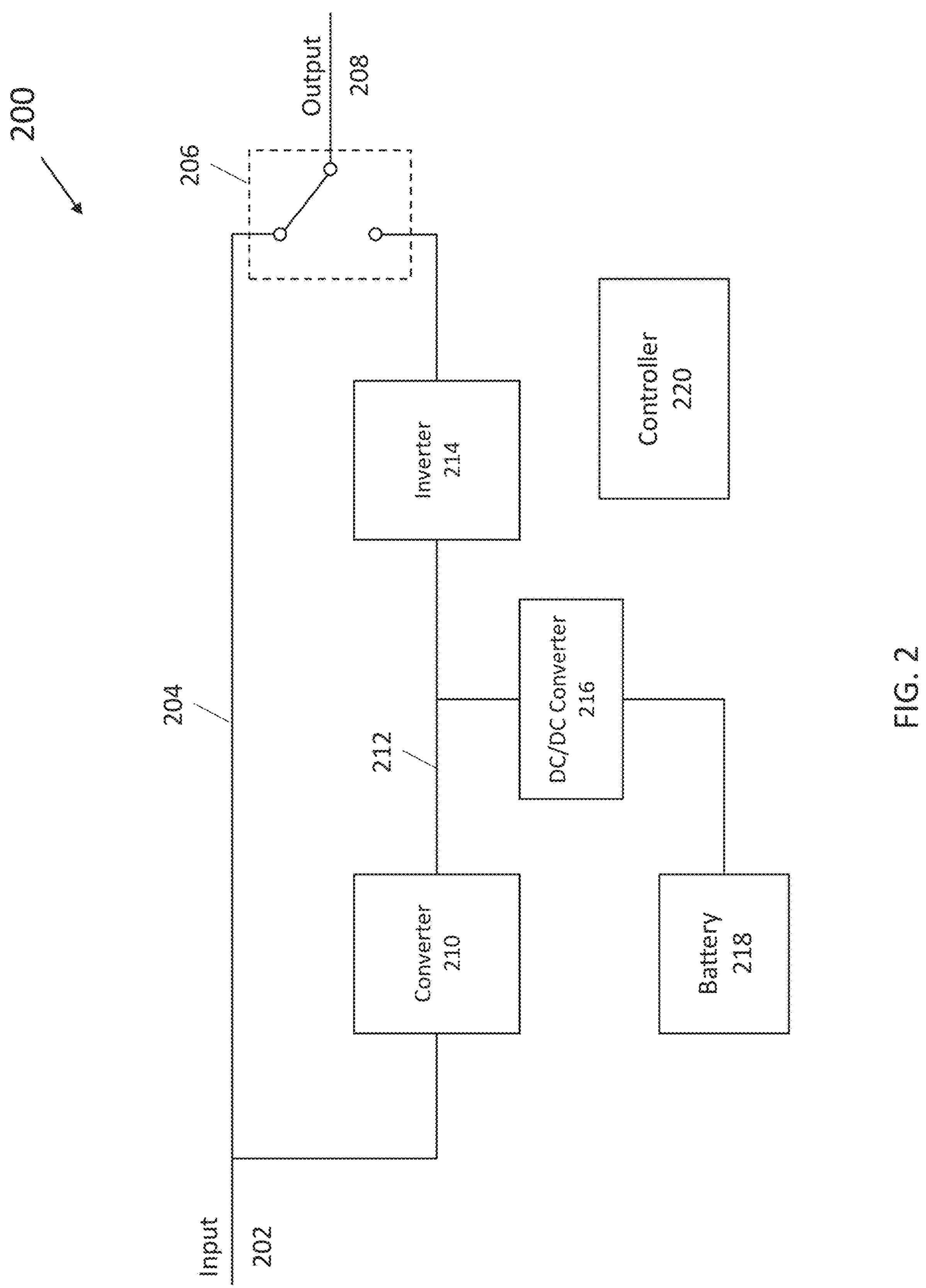
FIG. 2 is a functional block diagram of a UPS in accordance with aspects described herein.

FIG. 2 is a block diagram of an offline UPS 200. The UPS 200 includes an input 202, a bypass line 204, an output switch 206, an output 208, a converter 210, a DC bus 212, an inverter 214, and a DC/DC converter 216. In one example, the DC bus 212 may include a plurality of voltage rails (e.g., a positive rail, negative rail, etc.). In some examples, the UPS 200 may include a battery 218; however, in other examples the battery 218 may be external to the UPS 200. In addition, a controller 220 may be included in the UPS 200. In one example, the controller 220 may be coupled to and configured to operate the output switch 206, the converter 210, the inverter 214, and the DC/DC converter 216. In certain examples, the controller 220 may be external to the UPS 200.

The input 202 is coupled to the bypass line 204 and the converter 210. The output 208 is coupled to the bypass line 204 and the inverter 214 via the output switch 206. The converter 210 is coupled to the input 202 and the DC bus 212. The DC/DC converter 216 is coupled to the DC bus 212 and the battery 218. In some examples, the DC bus 212 includes at least one DC bus capacitor. The inverter 214 is coupled to the DC bus 212 and the output switch 206.

The UPS 200 is generally configured to operate in one of at least two modes of operation, including a line mode and a battery mode. The mode of operation of the UPS 200 is dependent upon a quality level of AC power received at the input 202 (for example, from a utility mains AC power supply). For example, when the AC power received at the input 202 is acceptable (i.e., within a specified range of acceptable electrical parameters), the UPS 200 may be configured to operate in the line mode. Otherwise, when the AC power received at the input 202 is not acceptable (i.e., not within a specified range of acceptable electrical parameters), the UPS 200 may be configured to operate in the battery mode. In some examples, the controller 224 may be coupled to the input 202 and configured to monitor the input 202 to determine whether to operate the UPS 200 in the line mode or the battery mode.

In the line mode, the output switch 206 is controlled such that the bypass line 204 is coupled to the output 208. The input 202 receives AC power from an external source (for example, from a utility mains AC power supply) and provides the received power to the output 208 and to the converter 210. The output 208 receives the power from the input 202 and provides the power to an external load (not shown). In the line mode, the converter 210 can receive the AC power from the input 202, convert the AC power into DC power, and provide DC power to the DC/DC converter 216 to charge the battery 218.

When acceptable AC power is not available at the input 202, the UPS 200 operates in battery mode. In the battery mode, the output switch 206 is controlled such that the inverter 214 is coupled to the output 220. The converter 210 discontinues charging the battery 218, and the battery 218 discharges stored DC power to the DC/DC converter 216. The DC/DC converter 216 regulates DC power received from the battery 218 and provides regulated DC power to the DC bus 212. The inverter 214 converts the received DC power to AC power and provides the AC power to the output 208 via the output switch 206 to provide electrical power to the external load.

As described above, UPS's can be used to protect loads by isolating them from the mains input and creating a clean and regulated voltage supply, to support the loads. However, if there is an onsite wiring issue, where the mains input is accidentally wired to the loads, this can create a back-feed event that prevents the UPS from protecting the loads. For example, in some buildings there may be loads ("unprotected loads") powered directly from mains whereas other loads ("protected loads") are powered by a UPS that sits between the protected loads and the mains. A back-feed event in this context can occur when an electrician improperly connects or mis-wires the output of the UPS to the input of an unprotected load. In this case, current is back-fed from the UPS inverter to the mains. If such a mis-wiring condition exists, when the mains voltage moves away from the nominal input voltage, such as during a surge, brownout or blackout condition, the UPS may not be able to protect or support the protected loads. Further, being that the UPS output has been misconnected to mains, during a brownout or blackout condition, the UPS may attempt to power other loads connected to mains (i.e., the power grid) from the battery. In most cases, the size and quantity of the loads connected to mains will greatly exceed the power output of the UPS (or the battery), causing the UPS to shutdown or fail. In some cases, the UPS may enter a failed state requiring user intervention or repair. In certain cases, the UPS may be permanently damaged and may damage other equipment (e.g., the protected loads).

In addition, back-feed relays in UPS s (e.g., the bypass relay 116 of the UPS 100 or the output switch 206 of the UPS 200) are responsible for separating the UPS output and utility/mains power. When the UPS is delivering power to the UPS output, the back-feed relay's main role is to prevent the UPS power from being provided to utility/mains input. If the UPS is inadvertently providing power back to the utility/mains input because of a back-feed relay error (e.g., a back-feed relay welding condition), when a user unplugs the UPS inlet, the user may inadvertently touch the contacts of the unplugged, but powered, UPS inlet and it may cause injury.

Typically, to detect back-feed relay welding, voltage sensing circuitry in the UPS is used to calculate the difference between line voltage and output voltage waveform. If the line voltage and output voltage difference is less than a threshold (i.e., substantially the same), then it can be determined that a back-feed relay welding is occurring during the backup/battery mode of the UPS. However, in the event of a failure or misreading of the voltage sensing circuity, the UPS may be unable to accurately detect a welding or back-feed condition. For example, if the input voltage detecting path is broken, the UPS may switch to the backup/battery mode even if the relay is welded, exposing the user to hazardous voltages or currents at the input. In addition, false detections of relay welding may occur at points in time where the frequency, voltage, and phase of the input and output voltages are the same.

As such, an improved UPS system and control method are provided herein. In at least one embodiment, the control method includes adjusting at least one parameter of the output AC power provided by the UPS and monitoring the input AC power and/or the output AC power to determine whether a fault has occurred. In some examples, the occurrence of a fault may indicate that the mains input has been mis-wired to the UPS output or to the load coupled to the UPS output. In certain examples, the occurrence of a fault may indicate that the contacts of at least one relay included in the UPS are welding or shorted together.

In one example, the presence of a mis-wiring or a back-feed condition can be detected through active and passive methods. In active methods, at least one parameter of the output AC power of the UPS (e.g., UPS 100 or UPS 200) is adjusted and a response is monitored in the input AC power and/or the output AC power. In at least some passive methods, a change in the input voltage is detected and a response in output AC power is monitored. The various active and passive methods are described in greater detail below.

In a first active method, the controller of the UPS intentionally lowers or increases its output voltage and detects how the output current responds. If a mis-wiring or back-feed condition exists, and the UPS output voltage is raised, the UPS output current (and power) will rise. If the UPS output voltage is lowered, the UPS output current (and power) will go down.

This temporary shift of the UPS output voltage can be done over a relatively small timeframe, as the response of the output current will be very fast in the presence of a mis-wiring or back-feed condition. In some examples, the controller of the UPS is configured to monitor the current of the output AC power at the output relative to a nominal current threshold to determine that a mis-wiring or back-feed condition has occurred.

Figure 3A:
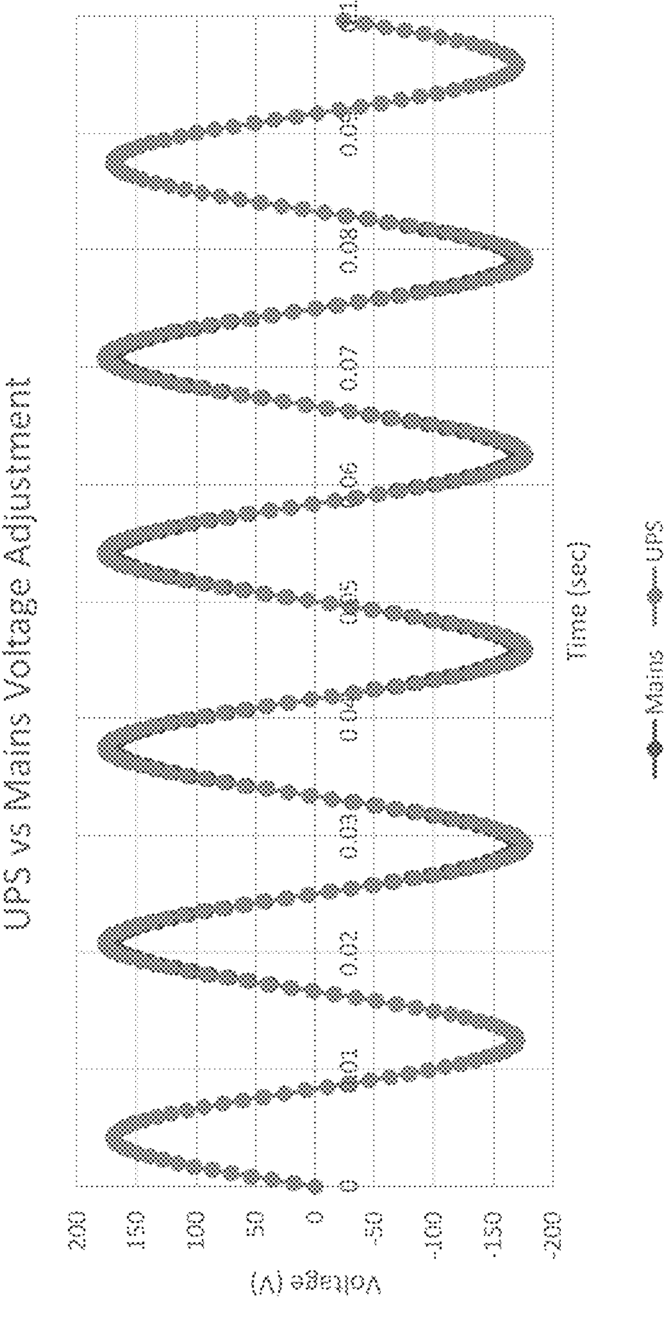
FIG. 3A is a plot of waveforms corresponding to a control method for a UPS in accordance with aspects described herein.
Figure 3B:
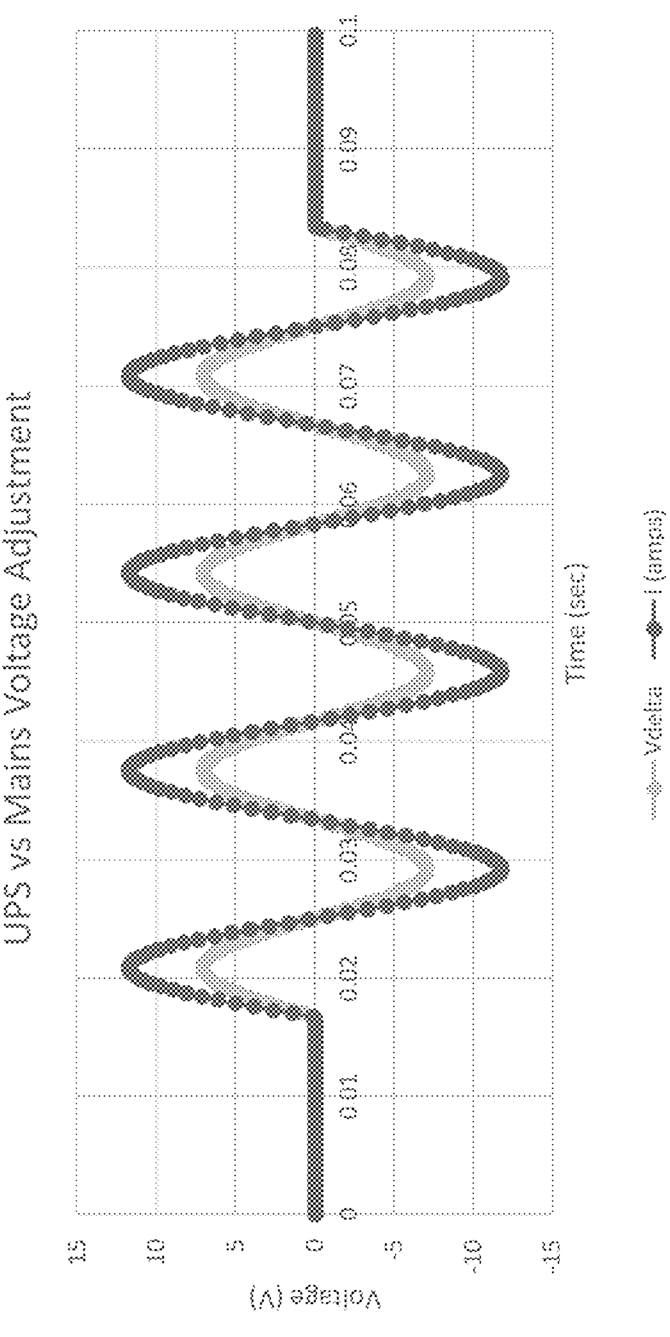
FIG. 3B is a plot of waveforms corresponding to a control method for a UPS in accordance with aspects described herein.

For example, FIG. 3A illustrates a mains AC voltage of 120V and an output AC voltage of the UPS that has been raised to 125V for a fixed number of cycles. As shown in FIG. 3B, over the fixed cycles where the output AC voltage is adjusted (i.e., Vdelta alternating between approximately ±5V), the UPS output current increases, indicating the presence of a mis-wiring or back-feed condition. In some examples, the UPS can monitor input voltage as a reference.

An example of output AC current values is illustrated in Table 1 below for a plurality of adjusted output AC voltages during a mis-wiring or back-feed condition:

TABLE 1

Active Method #1
Mains Voltage = 120 V

| | UPS Iout (A) | |
|---|---|---|
| UPS Vout (V) | Pload = 0 W | Pload = 5 KW |
| 116 | −5.0 | 18.0 |
| 117 | −3.8 | 19.1 |
| 118 | −2.5 | 20.3 |
| 119 | −1.3 | 21.4 |
| 120 | 0.0 | 22.5 |
| 121 | 1.3 | 23.7 |
| 122 | 2.5 | 24.8 |
| 123 | 3.8 | 26.0 |
| 124 | 5.0 | 27.1 |
| 125 | 6.3 | 28.2 |

As shown in Table 1, when the output AC voltage (UPS Vout) is lowered, relative to 120V, the output AC current (UPS Iout) decreases. Likewise, when the output AC voltage (UPS Vout) is increased, relative to 120V, the output AC current (UPS Iout) increases. The output AC current (UPS Iout) for a no-load case (Pload=0 W) and a load case (Pload=5 kW) is shown.

In a second active method, the controller of the UPS intentionally positively or negatively shifts its output voltage phase and detects how the output current responds. If a mis-wiring or back-feed condition exists, and the UPS output voltage is phase delayed, the UPS will have an elevated output current and an output reactive power with a negative sign. If a mis-wiring or back-feed condition exists and the UPS output voltage phase is advanced, the UPS will have elevated output current and an output reactive power with a positive sign. This temporary shift of the UPS output voltage phase can be done over a relatively small timeframe, as the response of the output current will be very fast in the presence of a mis-wiring or back-feed condition. In some examples, the controller of the UPS is configured to monitor the current and/or the reactive power of the output AC power at the output relative to a nominal current threshold to determine that a mis-wiring or back-feed condition has occurred.

Figure 4A:
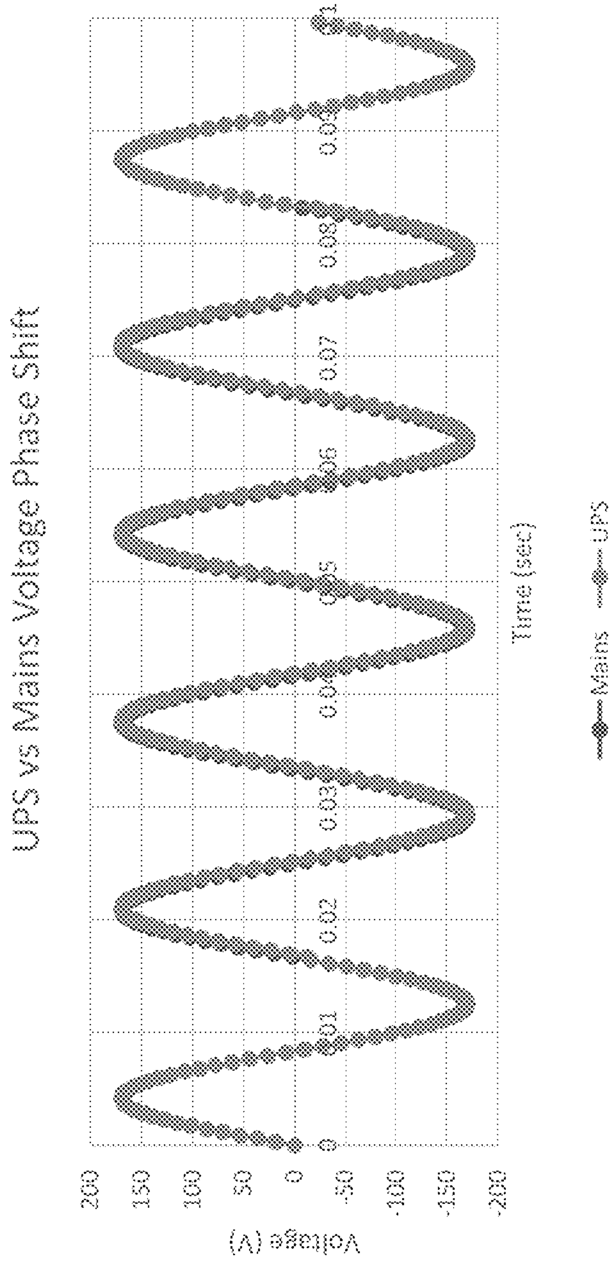
FIG. 4A is a plot of waveforms corresponding to a control method for a UPS in accordance with aspects described herein.
Figure 4B:
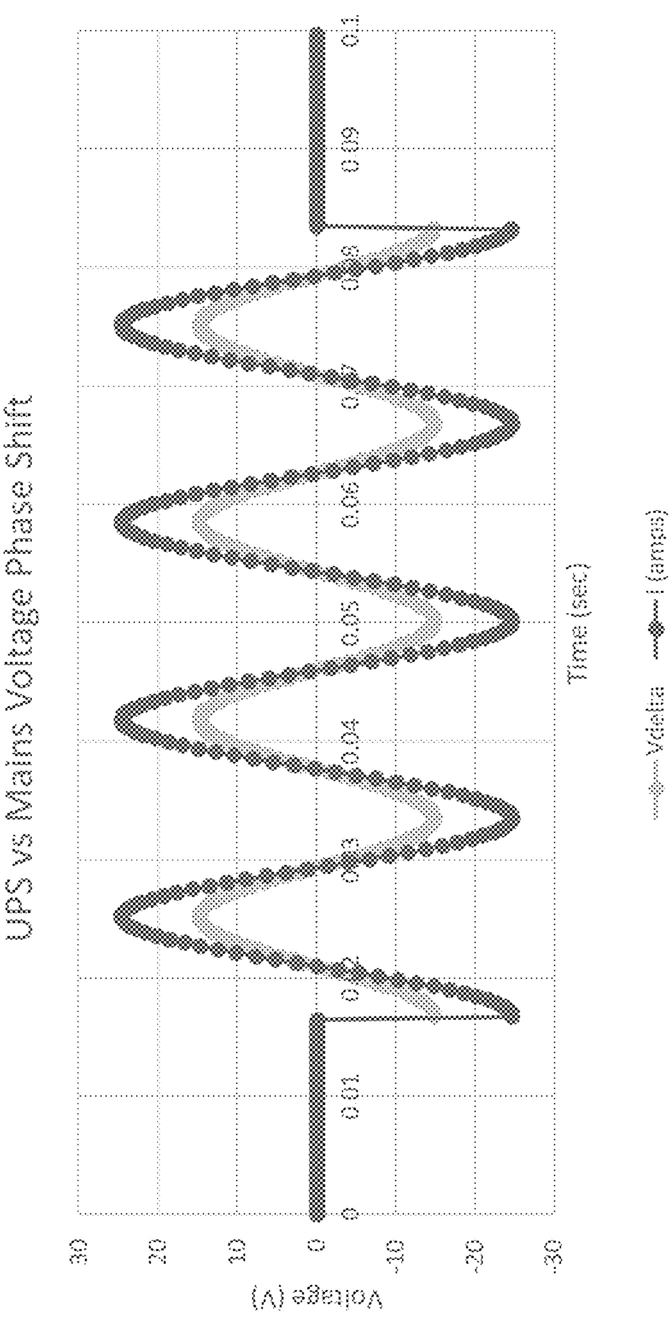
FIG. 4B is a plot of waveforms corresponding to a control method for a UPS in accordance with aspects described herein.

For example, FIG. 4A illustrates an output AC voltage of the UPS that has been phase delayed by 5 degrees relative to the mains AC voltage for a fixed number of cycles. As shown in FIG. 4B, over the fixed cycles where the output AC voltage is phase delayed (i.e., Vdelta alternating between approximately ±10V), the UPS output current increases, indicating the presence of a mis-wiring or back-feed condition. In some examples, the UPS can monitor input voltage as a reference.

An example of output reactive power values is illustrated in Table 2 below for a plurality of phase adjustments for the output AC power during a mis-wiring or back-feed condition:

TABLE 2

Active Method #2
Mains Voltage = 120 V

| | UPS Q1 (VA) Reactive power | |
|---|---|---|
| UPS Vout (V) | Pload = 0 W | Pload = 5 KW |
| 0 eg | 0 | 0 |
| 1 deg | −314.1 | −293.7 |
| 2 deg | −628.2 | −587.4 |
| 3 deg | −942 | −880.8 |
| 4 deg | −1255.6 | −1174.1 |
| 5 deg | −1568.8 | −1447 |
| −1 deg | 314.1 | 293.7 |
| −2 deg | 628.2 | 587.4 |
| −3 deg | 942 | 880.8 |
| −4 deg | 1255.6 | 1174.1 |
| −5 deg | 1568.8 | 1447 |

As shown in Table 2, when the phase of the output AC voltage (UPS Vout) is delayed (i.e., increased), the output reactive power (UPS Q1) has a negative sign. Likewise, when the phase of the output AC voltage (UPS Vout) is advanced (i.e., decreased), the output reactive power (UPS Q1) has a positive sign. The output reactive power (UPS Q1) for a no-load case (Pload=0 W) and a load case (Pload=5 kW) is shown.

Figure 5A:
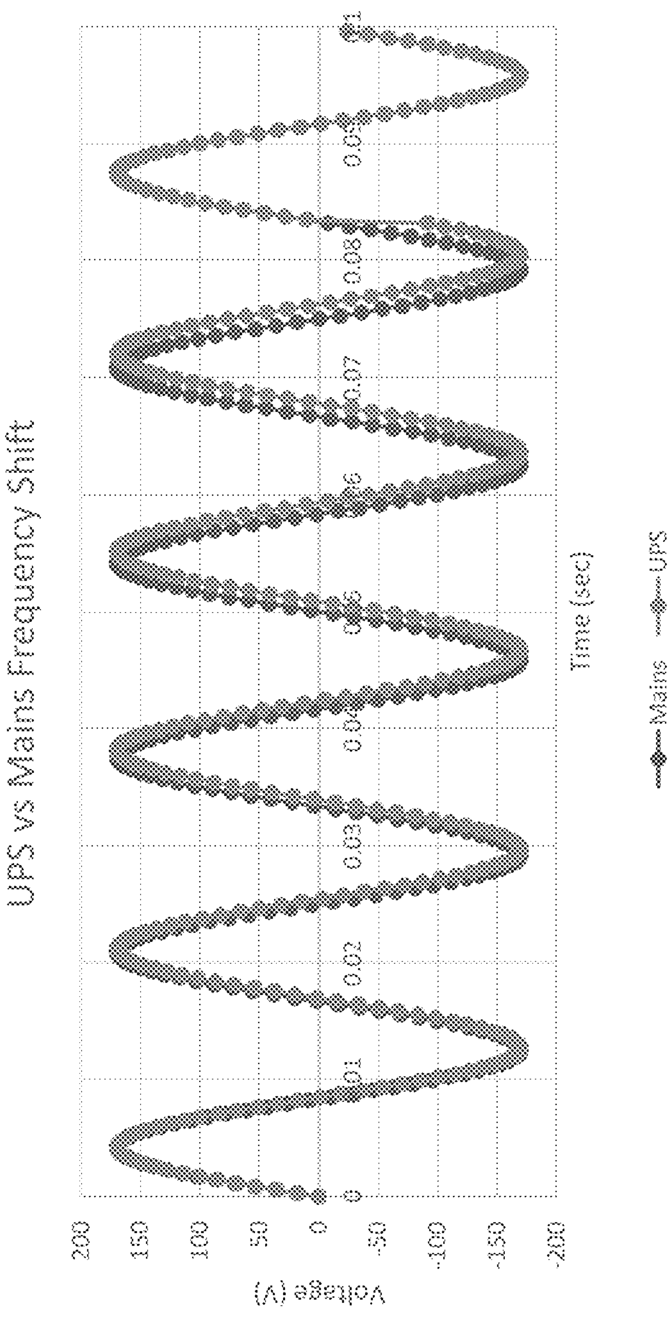
FIG. 5A is a plot of waveforms corresponding to a control method for a UPS in accordance with aspects described herein.
Figure 5B:
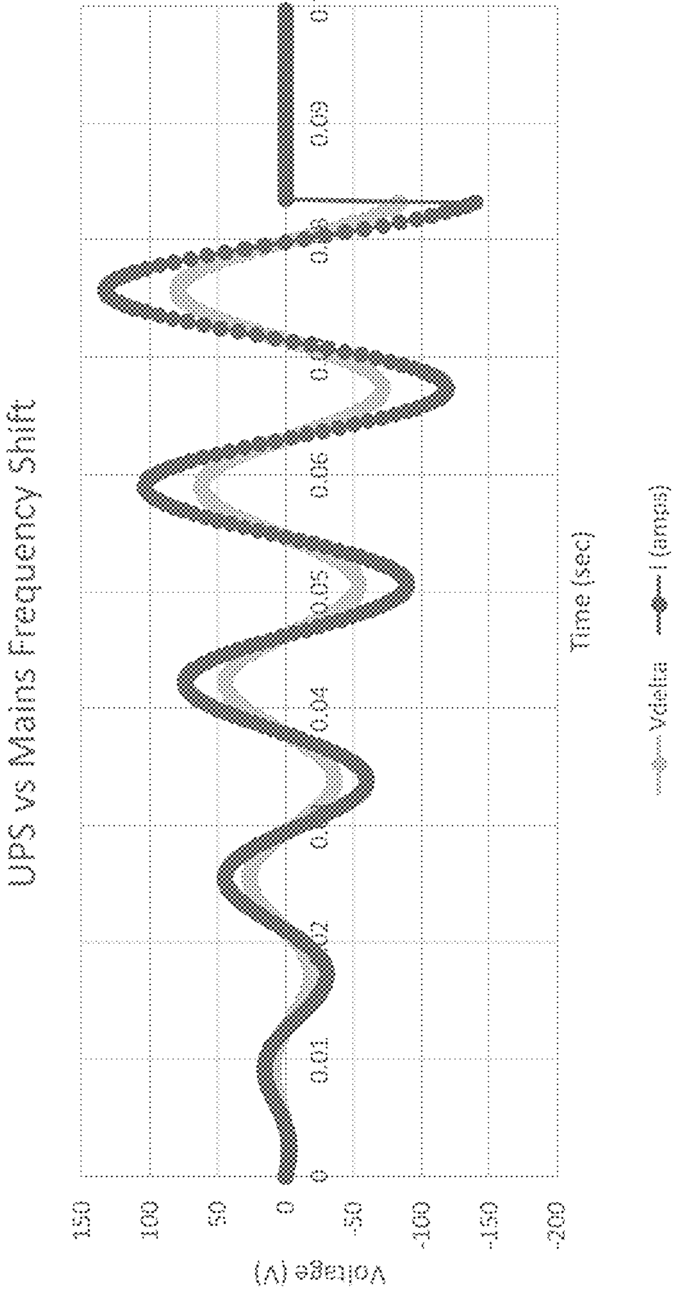
FIG. 5B is a plot of waveforms corresponding to a control method for a UPS in accordance with aspects described herein.

In a third active method, the controller of the UPS intentionally increases or decreases the frequency of the output AC power for a fixed number of cycles and detects how the output current responds. If a mis-wiring or back-feed condition exists, and the output frequency is increased or decreased, the UPS will have an elevated level of output reactive current and power, which will quickly ramp up. In some examples, the controller of the UPS is configured to monitor the current of the output AC power at the output relative to a nominal current threshold to determine that a mis-wiring or back-feed condition has occurred. For example, FIG. 5A illustrates a mains AC voltage having a frequency of 60 Hz and an output AC voltage of the UPS that has an adjusted frequency of 59 Hz for a fixed number of cycles. As shown in FIG. 5B, over the fixed cycles where the output AC voltage has an adjusted frequency, the UPS output current (and power) begins to ramp up, indicating the presence of a mis-wiring or back-feed condition. In some examples, the UPS can monitor input voltage as a reference.

In a fourth active method, the controller of the UPS intentionally adds a high frequency component to the output voltage waveform, for a fixed number of cycles. If a back-feed condition exists, and the high frequency component is 'injected' onto the output voltage waveform, the UPS can detect the presence of the high frequency component on the input voltage. In some examples, this can be accomplished with PLC (power line communication) techniques.

Figure 6A:
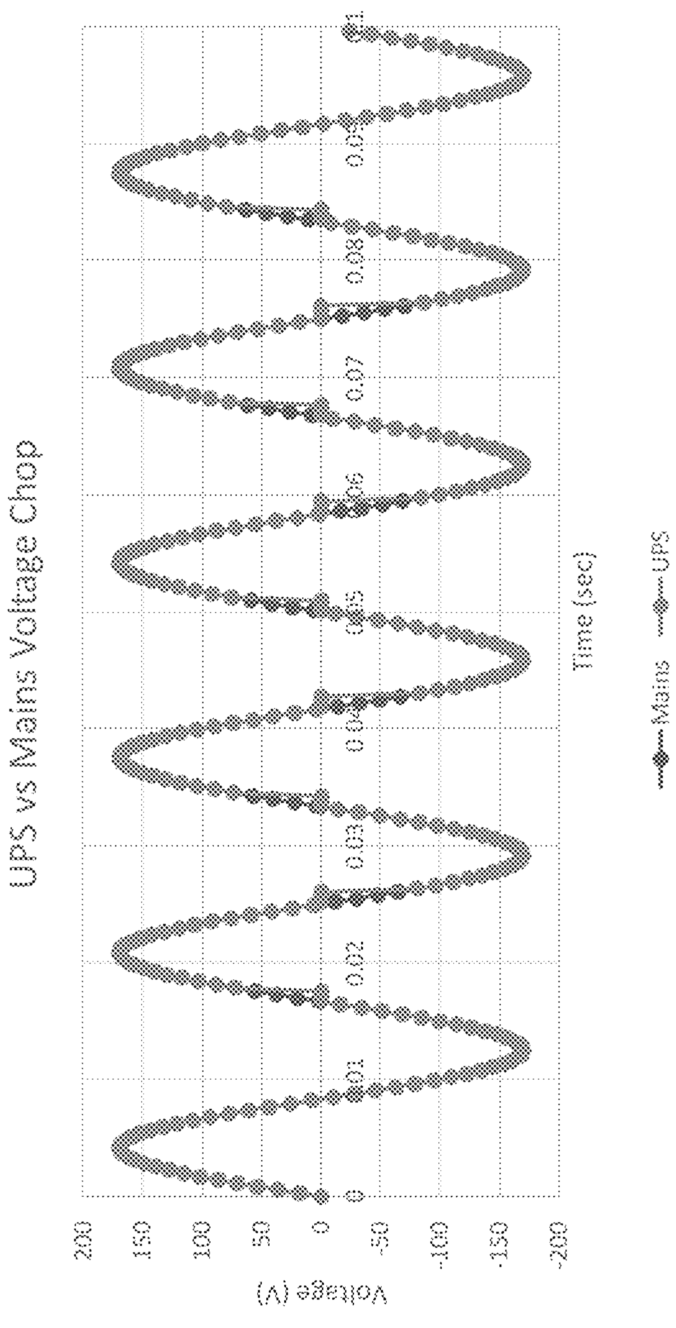
FIG. 6A is a plot of waveforms corresponding to a control method for a UPS in accordance with aspects described herein.
Figure 6B:
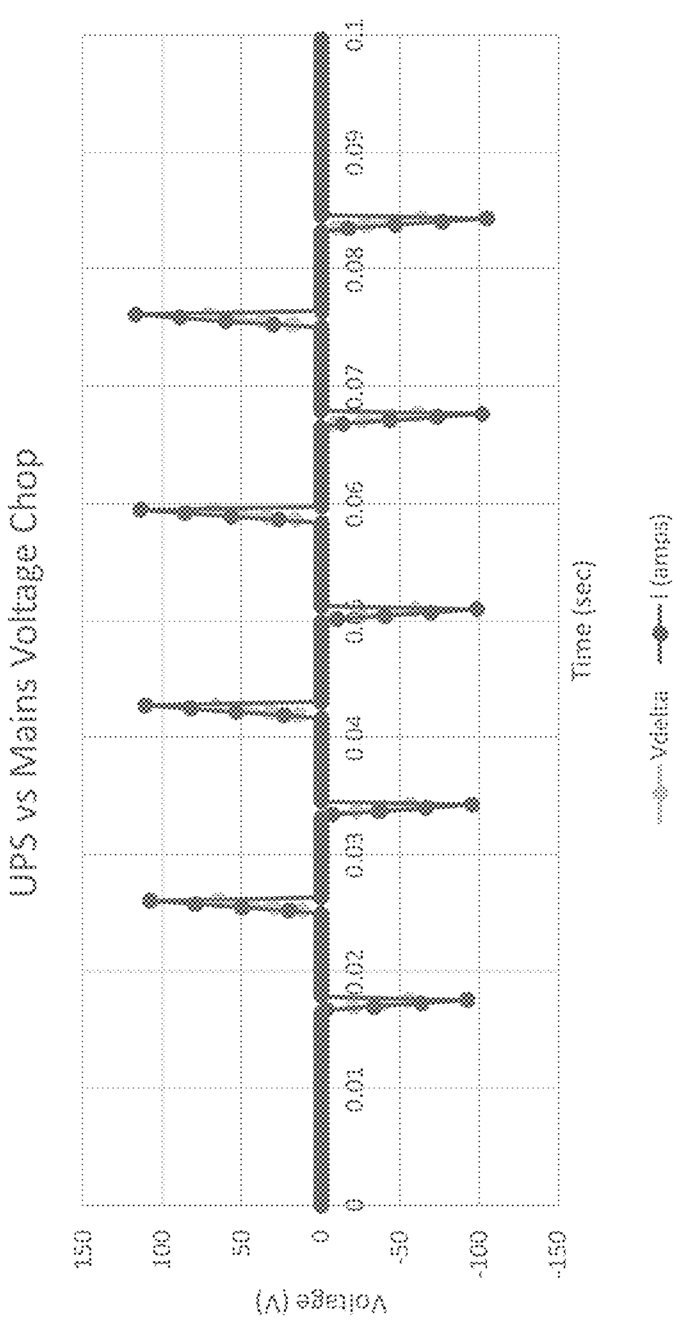
FIG. 6B is a plot of waveforms corresponding to a control method for a UPS in accordance with aspects described herein.

In a fifth active method, the controller of the UPS intentionally 'chops' a fixed portion of the output voltage waveform, for a fixed number of cycles, and detects how the output current responds. If a mis-wiring or back-feed condition exists, and the output voltage waveform is 'chopped', the UPS will experience an elevated level of reactive output current and reactive power. In some examples, the controller of the UPS is configured to monitor the current of the output AC power at the output relative to a nominal current threshold to determine that a mis-wiring or back-feed condition has occurred. For example, FIG. 6A illustrates an output AC voltage of the UPS that is chopped for 45 degrees for a fixed number of cycles. As shown in FIG. 6B, over the fixed cycles where the output AC voltage has been chopped, an elevated level of reactive output current and reactive power can be detected, indicating the presence of a mis-wiring or back-feed condition. In some examples, the UPS can monitor input voltage as a reference. As used herein, the term "nominal," as in the context of a nominal current or a nominal voltage, may be a predetermined or expected value of current or voltage for the UPS to operate as designed/intended. For example, a nominal input voltage may be 120 V.

In a passive method, the UPS monitors the input voltage (i.e., the mains voltage) and the UPS output current. If a mis-wiring or back-feed condition exists, a detection of a slight drop in the input voltage will result in an increase in the UPS output current (and power). Likewise, a detection of a slight increase in the input voltage will result in a decrease or corresponding change in the output current (and power).

An example of output AC current values is illustrated in Table 3 below for a plurality of mains input AC voltages during a mis-wiring or back-feed condition:

TABLE 3

| Passive Method<br>UPS Output Voltage = 120 V | | |
|---|---|---|
| | UPS Iout (A) | |
| Mains Voltage (V) | Pload = 0 W | Pload = 5 KW |
| 116 | 5.0 | 28.0 |
| 117 | 3.8 | 26.6 |
| 118 | 2.5 | 25.3 |
| 119 | 1.3 | 23.9 |
| 120 | 0.0 | 22.5 |
| 121 | −1.3 | 21.2 |
| 122 | −2.5 | 19.8 |
| 123 | −3.8 | 18.5 |
| 124 | −5.0 | 17.1 |
| 125 | −6.3 | 15.7 |

As shown in Table 3, when the mains input AC voltage drops, relative to 120V, the output AC current (UPS Iout) increases. Likewise, mains input AC voltage increases, relative to 120V, the output AC current (UPS Iout) decreases. The output AC current (UPS Iout) for a no-load case (Pload=0 W) and a load case (Pload=5 kW) is shown.

In place of or in addition to monitoring the input voltage at the input and/or monitoring the output current at the output, in at least some passive methods, the input AC power is monitored at the input for a change in frequency and/or the output AC power is monitored at the output for a change in frequency. A detection of a change in frequency is indicative of a mis-wiring or back-feed condition.

In at least one passive method, detecting a change in voltage or current includes detecting that the voltage or current increased above a threshold or dropped below a threshold. Furthermore, detecting a change includes, in at least one passive method, detecting that the output voltage or current changed as much as would be expected given the change detected at the input if a short circuit were present.

Figure 7:
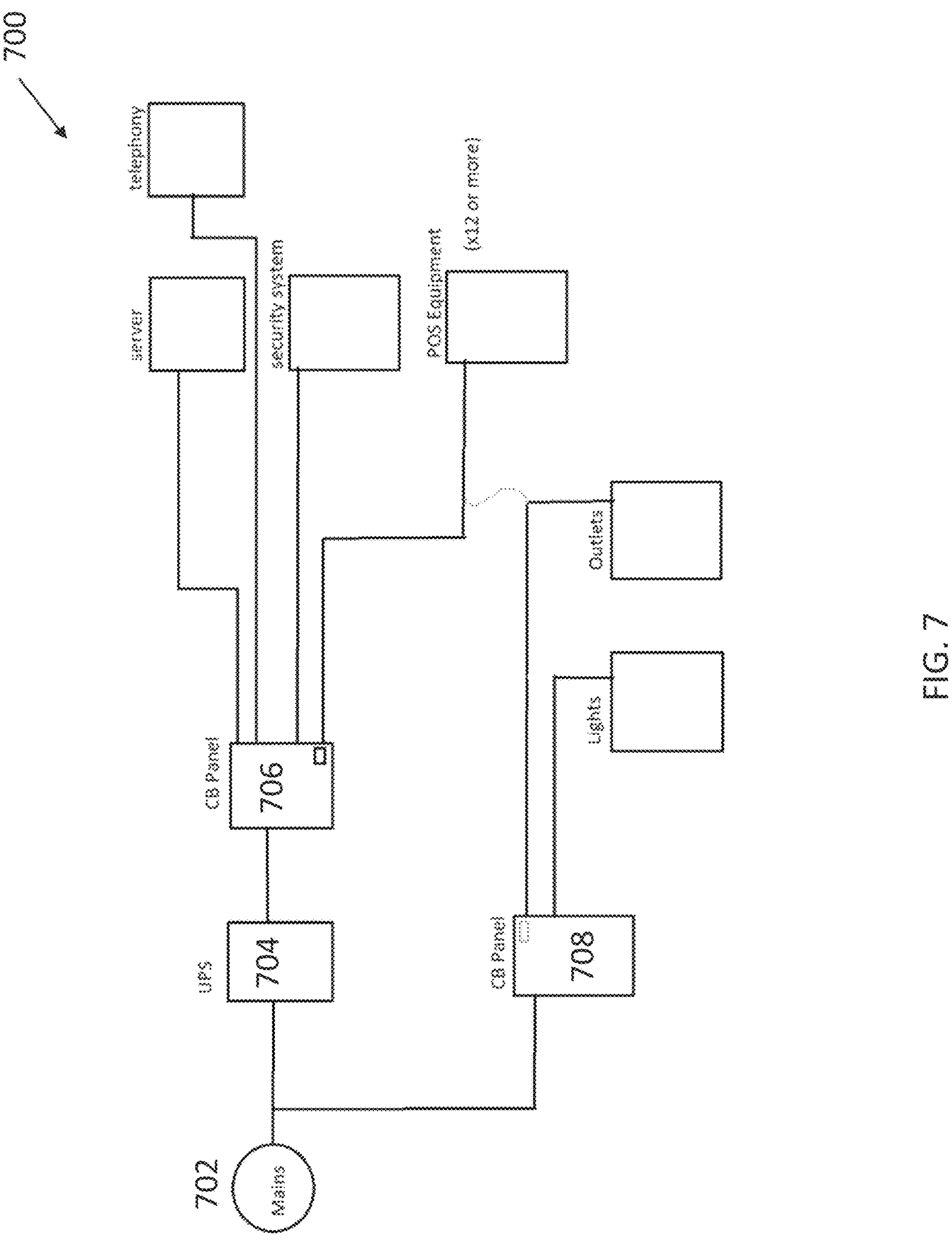
FIG. 7 is a block diagram of a power system in accordance with aspects described herein.

In one example, the active and passive methods described above can be used to detect the occurrence of mis-wirings or back-feed conditions in a building. For example, in some buildings there may be loads ("unprotected loads") powered directly from mains whereas other loads ("protected loads") are powered by a UPS that sits between the protected loads and the mains. A back-feed event in this context can occur when an electrician improperly connects or mis-wires the output of the UPS to the input of an unprotected load. For example, FIG. 7 illustrates a block diagram of a power system 700 including protected and unprotected loads. As shown, a UPS 704 is coupled to mains 702 and configured to provide power to a first circuit breaker 706. The first circuit breaker 706 provides power to a set of protected loads. In one example, the set of protected loads includes a server, a security system, telephony equipment, and point-of-sale (POS) equipment. Likewise, a second circuit breaker 708 is coupled to mains 702 and configured to provide power to a set of unprotected loads. In one example, the set of unprotected loads includes lights and outlets.

In the event the output of the UPS 704 (or the output of the first circuit breaker 706) is inadvertently connected or mis-wired to the second circuit breaker 708 or the input of one of the unprotected loads, current may be back-fed from the inverter of the UPS 704 to mains 702. In other words, the protected loads may be shorted to mains 702 via the second circuit breaker 708, bypassing the UPS 704. If such a mis-wiring condition exists, when the mains voltage moves away from the nominal input voltage, such as during a surge, brownout or blackout condition, the UPS 704 may not be able to protect or support the protected loads. As such, the active and passive methods described above can be used to detect such mis-wirings and back-feed conditions indicating that the protected loads are not configured properly with the UPS 704.

As described above, back-feed relays in UPS s (e.g., the bypass relay 116 of the UPS 100 or the output switch 206 of the UPS 200) are responsible for separating the UPS output and utility/mains power. When the UPS is delivering power to the UPS output, the back-feed relay's main role is to prevent the UPS power from being provided to utility/mains input. If the UPS is inadvertently providing power back to the utility/mains input because of a back-feed relay welding, when a user unplugs the UPS inlet, the user may touch the powered inlet and it may cause injury. As such, the UPS may check for relay welding to detect conditions in which power is inadvertently being provided to the input. In some examples, the UPS includes voltage sensing circuitry and back-feed relay welding can be detected by comparing input and output voltage values. In some examples, when the voltage difference is relatively small, a relay welding condition can be detected. However, such testing may not work if the voltage sensing circuit is inoperable. For example, if a component failure occurs in the input voltage sense path, it will cause a test failure because the input voltage cannot be sensed.

Accordingly, in a sixth active method, two different input line sense paths are used (e.g., a voltage path and a frequency path). By utilizing both paths, the combined detection methods cover double fault test criteria. In the sixth active method, when detecting by frequency, if the input and output frequency are the same, the output frequency can be changed slowly, which also benefits the voltage sense detection to avoid a false detection.

Figure 8A:
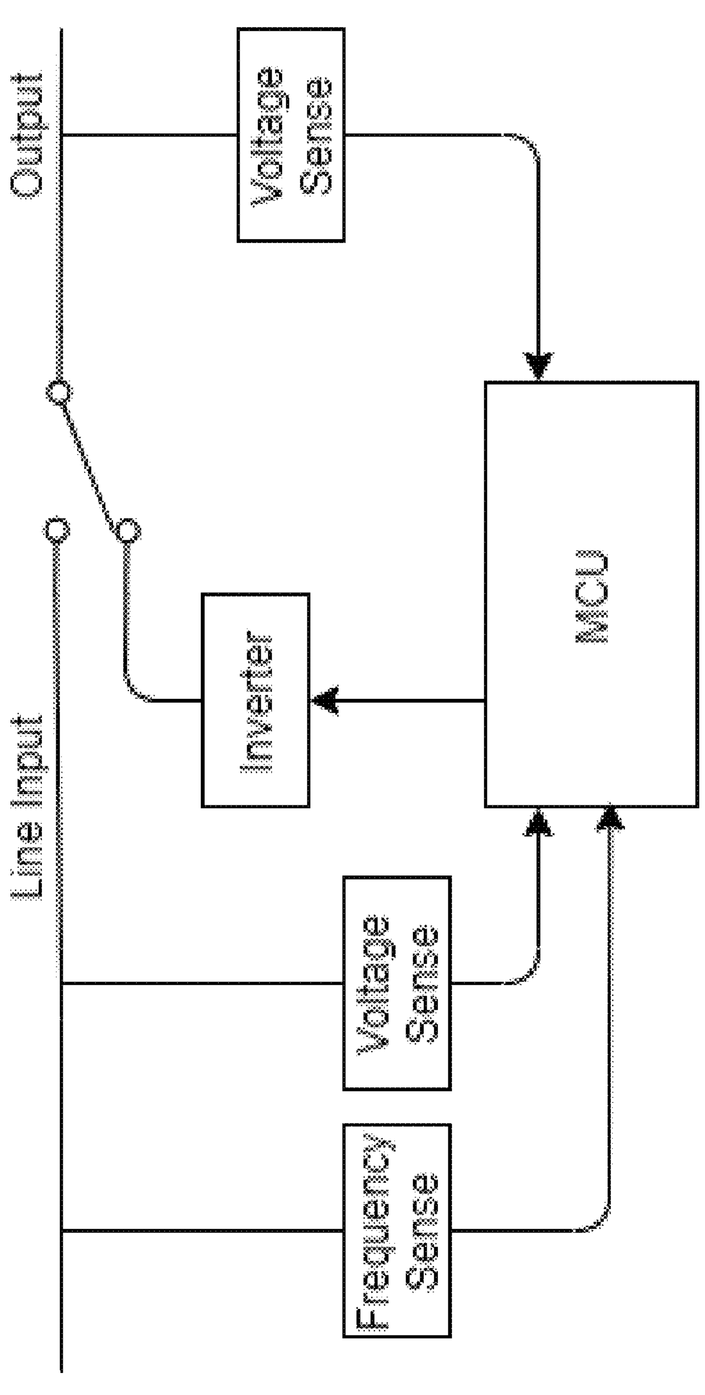
FIG. 8A is a functional block diagram of a UPS in accordance with aspects described herein.
Figure 8B:
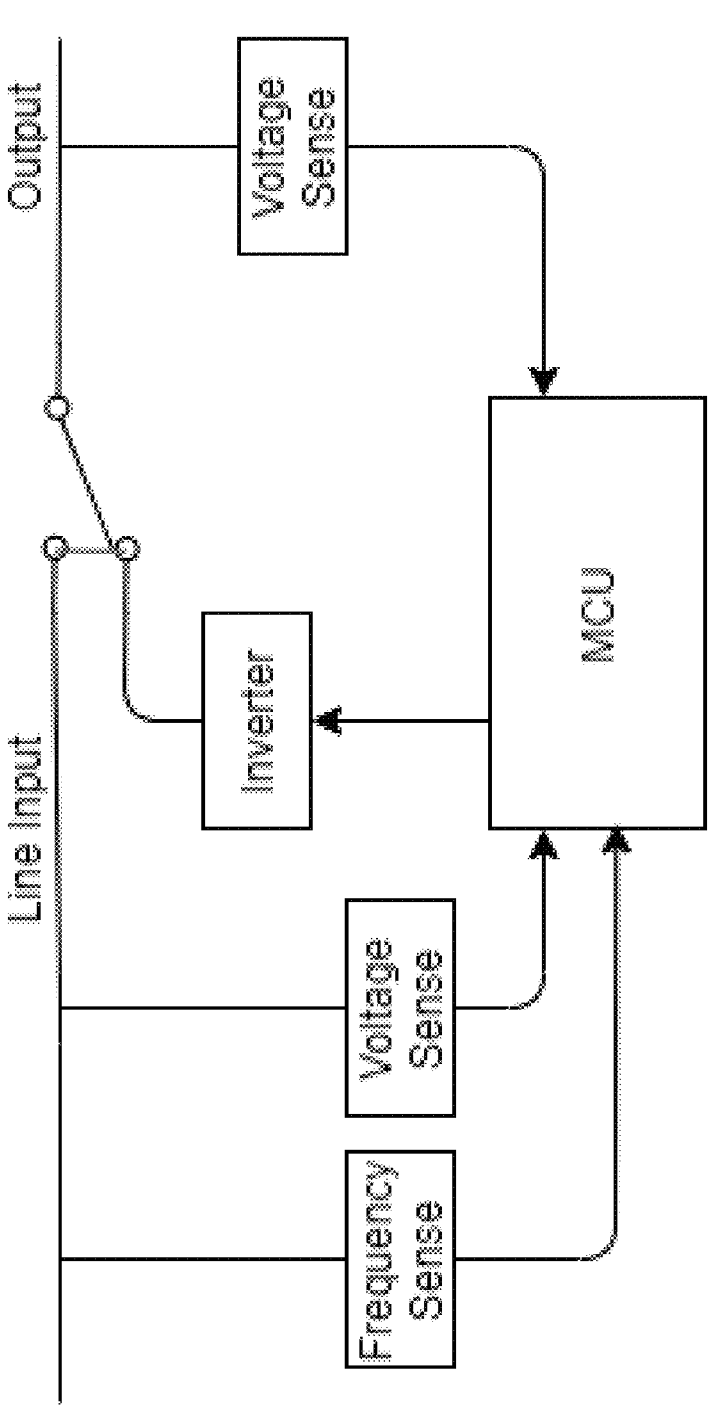
FIG. 8B is a functional block diagram of a UPS in accordance with aspects described herein.

As shown in FIG. 8A, in the normal condition (e.g., bypass mode), the line input and inverter output are not connected. In some examples, the relay can experience a welding condition due to arcing between the contacts or if the relay becomes damaged or broken. In certain examples, the relay may be intentionally shorted during a safety test to check the gap between the contacts of the relay. As shown in FIG. 8B, during a welding condition, the line input and the inverter output are shorted, and the UPS transfers to the backup/battery mode. There are two paths for sensing input information, one sense path for the input voltage and the other for input frequency. For detecting the relay welding in double fault condition, the frequency and voltage are utilized at the same time to detect the relay welding. Both detections, voltage and frequency, can cover for the other if there is a failure in one of the paths.

As such, the sixth active method may be used to detect a relay welding or back-feed condition in the event of a failure or misreading of the voltage sensing circuitry. In the sixth active method, both the differences between input/output voltage and input/output frequency are monitored. If either of the differences are relatively small, a back-feed condition can be identified. If a relatively small difference between the input and output (i.e., inverter) frequency is detected, the output frequency is adjusted slightly to identify if there is a corresponding change in the input frequency. If the change in output frequency is also exhibited in the input frequency, a back-feed condition can be identified. In some examples, it can be determined that a fault (i.e., back-feed condition) has occurred in response to the frequency of the input AC power and the adjusted frequency of the output AC power being substantially the same and the voltage of the input AC power and the adjusted voltage of the output AC power being substantially the same. In one example, an analog-to-digital converter (ADC) can be used to process sync signals provided by the voltage and/or frequency sensing circuitry. The phrase "substantially the same" as used above in context of the adjusted frequency is meant to correspond to a threshold difference between the adjusted output AC power and the resulting adjusted input AC power. In one example, the threshold difference is between about 0 Hz and about 1 Hz. In other examples, the threshold difference is between about 0 Hz and about 5 Hz or between about 0 Hz and about 20 Hz. Additionally, the phrase "substantially the same" as used above in context of the adjusted frequency is meant to correspond to a voltage difference threshold between the adjusted output AC power and the resulting adjusted input AC power. In one example, the voltage difference threshold is between about 0 V and about 0.5 V. In other examples, the threshold difference is between about 0 V and about 1 V or between about 0 V and 5 V. It is appreciated that embodiments are not limited to only these ranges.

Figure 9:
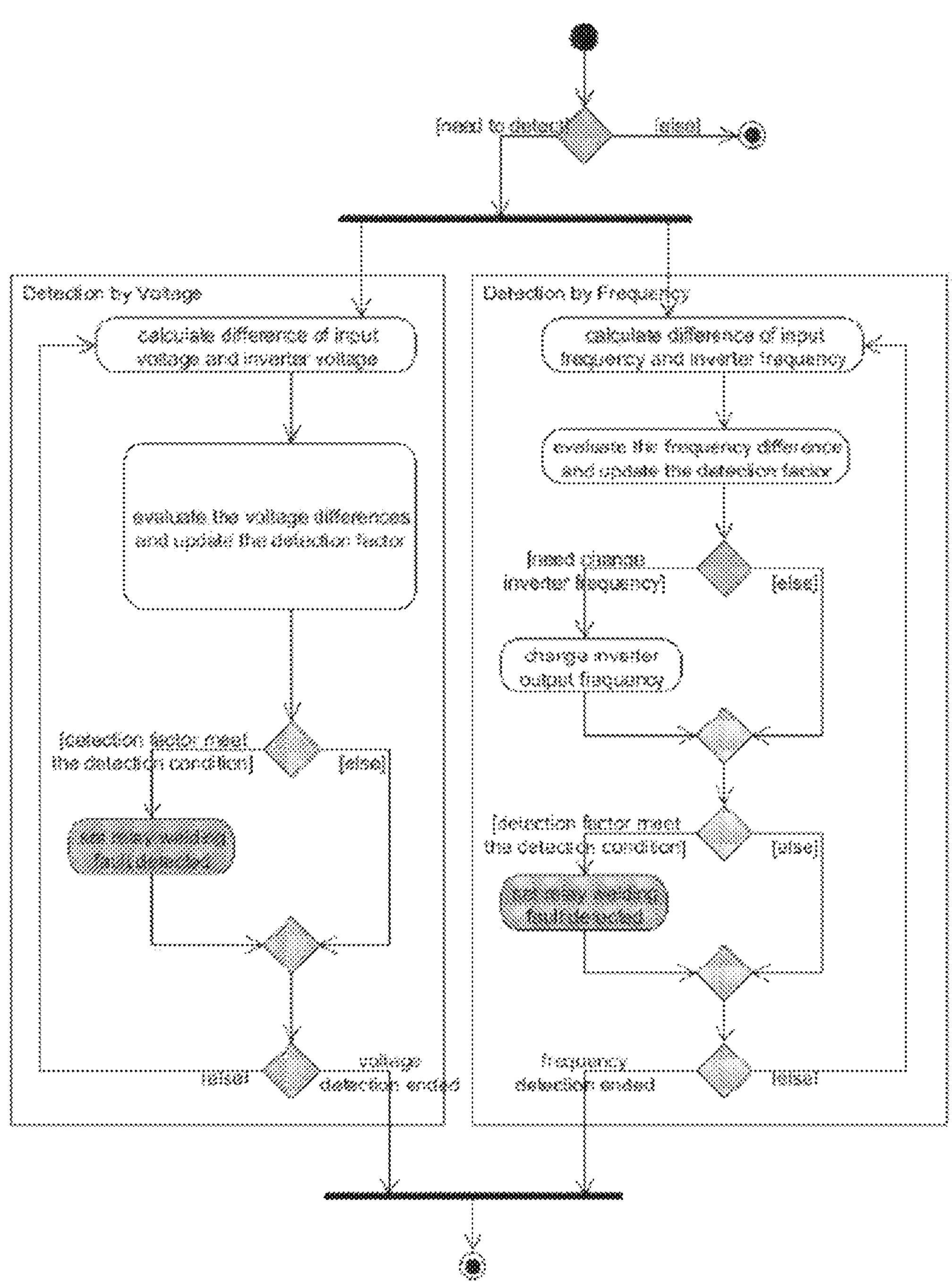
FIG. 9 is a flow diagram corresponding to a control method for a UPS in accordance with aspects described herein.

FIG. 9 is a flow diagram of a control method corresponding to the sixth active method. The control method runs in the beginning of the backup/battery mode of the UPS, and the detection of voltage and detection of frequency are running at the same time. If either of the voltage or frequency sensing indicates a relay welding, the UPS will go to fault. Each time a back-feed relay welding is detected, the inverter voltage and frequency is controlled by the MCU during the backup/battery mode. If the relay is not welded, input frequency should not always be the same as the inverter output frequency. If the input frequency is as same as the inverter frequency after the inverter frequency is changed, it can be determined that a relay welding has happened. In some embodiments, the detection-by-frequency portion of the control method can be implemented without (or independent from) the detection-by-voltage portion of the control method.

As described above, the sixth active method provides a method to pass safety criteria of the back-feed relay, as it allows the UPS to detect a back-feed relay welding event, even when the line voltage sense path is broken. In some examples, the sixth active method can be used to detect different relay welding events in the UPS.

As described above, an improved UPS system and control method are provided herein. In at least one embodiment, the control method includes adjusting at least one parameter of output AC power and monitoring input AC power and/or the output AC power to determine whether a fault has occurred.

In some examples, the occurrence of a fault may indicate that the mains input has been mis-wired to the UPS output or to the load coupled to the UPS output. In certain examples, the occurrence of a fault may indicate that the contacts of at least one relay included in the UPS are welding or shorted together.

It is appreciated that the control method is applicable to additional apparatus apart from a UPS. For example, responsive to adjusting the at least one parameter of the output AC power, one or both of the input or the output of a power supply is monitored. The determination of a fault may be based on the monitoring and an adjusted input AC power following the adjustment of the at least one parameter of the output AC power. The determination of a fault may also be based on the monitoring and an adjusted input AC power following the adjustment of the at least one parameter of the output AC power. In addition to power supplies, it is appreciated that applicable apparatuses include power generators, solar powered inverters, and variable frequency drives (VFDs).

In power generator applications, back-feed from a generator can cause serious risks and dangers to equipment as well as people interacting with such equipment, especially with but not limited to portable generators. A generator which regulates its own output voltage and/or frequency, for example, can utilize the same principles described herein to detect a back-feed condition, which could then indicate a fault and so forth, prompting one or more notifications. These reasons also apply to solar inverter applications. Other applications include any type of energy supply connected to an inverter such as a wind powered system. In VFD applications, additional considerations may be required if the VFD is intentionally designed for bi-directional power flow.

Having thus described several aspects of at least one embodiment of this invention, it is to be appreciated various alterations, modifications, and improvements will readily occur to those skilled in the art. Such alterations, modifications, and improvements are intended to be part of this disclosure and are intended to be within the spirit and scope of the invention. Accordingly, the foregoing description and drawings are by way of example only.

What is claimed is:

1. A power supply comprising:

an input configured to receive input AC power;

an output configured to provide output AC power to a load;

at least one power converter coupled to the input and configured to convert the input AC power into the output AC power; and at least one controller coupled the at least one power converter, the at least one controller being configured to:

adjust at least one parameter of the output AC power provided by the at least one power converter, detect, in response to adjusting the at least one parameter of the output AC power, at least one of an adjusted input AC power or an adjusted output AC power, and determine that a fault has occurred based on the at least one of the adjusted input AC power or the adjusted output AC power, wherein the fault provides an indication that the input is shorted to the output.

2. The power supply of claim 1, wherein adjusting the at least one parameter of the output AC power comprises adding a high frequency component to the output AC power.

3. The power supply of claim 2, wherein determining that the fault has occurred based on the adjusted output AC power comprises determining that the fault has occurred in response to a detection of the high frequency component in the adjusted input AC power.

4. The power supply of claim 1, wherein determining that the fault has occurred includes determining that the fault has occurred based on the adjusted input AC power.

5. The power supply of claim 1, wherein determining that the fault has occurred includes determining that the fault has occurred based on the adjusted output AC power.

6. The power supply of claim 1, wherein adjusting the at least one parameter of the output AC power comprises adjusting a frequency of the output AC power.

7. The power supply of claim 6, wherein adjusting the frequency of the output AC power comprises adjusting the frequency of the output AC power such that the frequency of the adjusted output AC power is different than a frequency of the input AC power.

8. The power supply of claim 6, wherein determining that the fault has occurred based on the at least one of the adjusted input AC power or the adjusted output AC power comprises determining that the fault has occurred in response to a difference between a frequency of the adjusted input AC power and the frequency of the adjusted output AC power being less than a threshold difference.

9. The power supply of claim 8, wherein determining that the fault has occurred based on the at least one of the adjusted input AC power or the adjusted output AC power comprises determining that the fault has occurred in response to the difference between the frequency of the adjusted input AC power and the frequency of the adjusted output AC power being less than the threshold difference and a difference between a voltage of the adjusted input AC power and a voltage of the adjusted output AC power being less than a voltage difference threshold.

10. The power supply of claim 1, wherein detecting the at least one of the adjusted input AC power or the adjusted output AC power comprises monitoring a current of the output AC power at the output relative to a nominal current threshold.

11. The power supply of claim 10, wherein determining that the fault has occurred based on the at least one of the adjusted input AC power or the adjusted output AC power comprises determining that the fault has occurred in response to the current of the adjusted output AC power rising above the nominal current threshold.

12. The power supply of claim 10, wherein determining that the fault has occurred based on the at least one of the adjusted input AC power or the adjusted output AC power comprises determining that the fault has occurred in response to the current of the adjusted output AC power falling below the nominal current threshold.

13. The power supply of claim 1, wherein detecting the at least one of the adjusted input AC power or the adjusted output AC power comprises monitoring the input AC power at the input.

14. The power supply of claim 1, wherein detecting the at least one of the adjusted input AC power or the adjusted output AC power comprises monitoring the output AC power at the output.

15. The power supply of claim 1, wherein adjusting the at least one parameter of the output AC power comprises adjusting a phase of the output AC power.

16. The power supply of claim 1, wherein adjusting the at least one parameter of the output AC power comprises adjusting a voltage of the output AC power.

17. The power supply of claim 16, wherein adjusting the voltage of the output AC power comprises chopping a portion of the voltage of the output AC power.

18. A non-transitory computer-readable medium storing thereon sequences of computer-executable instructions for operating a power supply, the sequences of computer-executable instructions including instructions that instruct at least one processor to control the power supply to:

receive input AC power at an input of the power supply; provide output AC power to an output of the power supply;

operate at least one power converter to convert the input AC power into the output AC power;

adjust at least one parameter of the output AC power provided by the at least one power converter;

detect, in response to adjusting the at least one parameter of the output AC power, at least one of an adjusted input AC power or an adjusted output AC power; and determine that a fault has occurred based on at least one of the adjusted input AC power or the adjusted output AC power, wherein the fault provides an indication that the input of the power supply is shorted to the output of the power supply.

19. The non-transitory computer-readable medium of claim 18, wherein adjusting the at least one parameter of the output AC power comprises adding a high frequency component to the output AC power.

20. A method of operating a power supply including an input configured to receive input AC power, an output configured to provide output AC power to a load, at least one power converter coupled to the input and configured to convert the input AC power into the output AC power, and at least one controller coupled to the at least one power converter, the method comprising:

receiving input AC power at the input;

providing, at the output, output AC power to the load;

converting, by the at least one power converter, the input AC power into the output AC power coupled to the input;

adjusting at least one parameter of the output AC power provided by the at least one power converter;

detecting, in response to adjusting the at least one parameter of the output AC power, at least one of an adjusted input AC power or an adjusted output AC power; and determining that a fault has occurred based on the at least one of the adjusted input AC power or the adjusted output AC power, wherein the fault provides an indication that the input is shorted to the output.

* * * * *